(12) United States Patent
Minami et al.

(10) Patent No.: US 12,258,646 B2
(45) Date of Patent: *Mar. 25, 2025

(54) HIGH-STRENGTH STEEL SHEET AND METHOD FOR PRODUCING SAME

(71) Applicant: JFE STEEL CORPORATION, Tokyo (JP)

(72) Inventors: Hidekazu Minami, Tokyo (JP); Yuji Tanaka, Tokyo (JP); Takeshi Yokota, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 834 days.

This patent is subject to a terminal disclaimer.

(21) Appl. No.: 17/593,062

(22) PCT Filed: Feb. 21, 2020

(86) PCT No.: PCT/JP2020/007200
§ 371 (c)(1),
(2) Date: Sep. 8, 2021

(87) PCT Pub. No.: WO2020/184154
PCT Pub. Date: Sep. 17, 2020

(65) Prior Publication Data
US 2022/0195552 A1 Jun. 23, 2022

(30) Foreign Application Priority Data
Mar. 11, 2019 (JP) ................. 2019-044066

(51) Int. Cl.
| | | |
|---|---|---|
| C21D 9/46 | (2006.01) |
| B32B 15/01 | (2006.01) |
| C21D 6/00 | (2006.01) |
| C21D 8/02 | (2006.01) |
| C22C 38/00 | (2006.01) |
| C22C 38/02 | (2006.01) |
| C22C 38/06 | (2006.01) |
| C22C 38/20 | (2006.01) |
| C22C 38/22 | (2006.01) |
| C22C 38/24 | (2006.01) |
| C22C 38/26 | (2006.01) |
| C22C 38/28 | (2006.01) |
| C22C 38/30 | (2006.01) |
| C22C 38/32 | (2006.01) |
| C22C 38/38 | (2006.01) |
| C22C 38/40 | (2006.01) |
| C23C 2/02 | (2006.01) |
| C23C 2/28 | (2006.01) |

(52) U.S. Cl.
CPC .............. *C21D 9/46* (2013.01); *B32B 15/013* (2013.01); *C21D 6/004* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C22C 38/001* (2013.01); *C22C 38/002* (2013.01); *C22C 38/005* (2013.01); *C22C 38/008* (2013.01); *C22C 38/02* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/38* (2013.01); *C22C 38/40* (2013.01); *C23C 2/02* (2013.01); *C23C 2/0224* (2022.08); *C23C 2/024* (2022.08); *C23C 2/28* (2013.01); *C21D 2211/001* (2013.01); *C21D 2211/005* (2013.01)

(58) Field of Classification Search
CPC ........................................ C21D 9/46
See application file for complete search history.

(56) References Cited

U.S. PATENT DOCUMENTS

| | | |
|---|---|---|
| 8,993,120 B2 | 3/2015 | Kawata et al. |
| 10,501,832 B2 | 12/2019 | Hayashi et al. |
| 10,662,496 B2 | 5/2020 | Kawasaki et al. |
(Continued)

FOREIGN PATENT DOCUMENTS

| | | |
|---|---|---|
| CN | 103842543 A | 6/2014 |
| CN | 105324506 A | 2/2016 |
(Continued)

OTHER PUBLICATIONS

May 19, 2020, International Search Report issued in the International Patent Application No. PCT/JP2020/007200.
(Continued)

Primary Examiner — Jophy S. Koshy
(74) Attorney, Agent, or Firm — KENJA IP LAW PC

(57) ABSTRACT

A high-strength steel sheet comprises: a chemical composition containing C, Si, Mn, P, S, Al, N, Mo, Cr, Ca, and Sb with a balance consisting of Fe and inevitable impurities, wherein [% Si], [% Mn], [% P], [% Mo], and [% Cr] satisfy a predetermined relationship; a steel microstructure that contains ferrite, hard phase, and retained austenite and in which a carbon concentration in the retained austenite is 0.55% or more and 1.10% or less, an amount of diffusible hydrogen in the steel sheet is 0.80 mass ppm or less, a surface layer softening thickness is 5 μm or more and 150 μm or less, and a corresponding grain boundary frequency in a surface layer of the steel sheet after a high-temperature tensile test is 0.45 or less; and a tensile strength of 980 MPa or more.

17 Claims, 1 Drawing Sheet

(56) References Cited

U.S. PATENT DOCUMENTS

| | | |
|---|---|---|
| 11,377,708 B2 | 7/2022 | Hasegawa et al. |
| 11,408,058 B2 * | 8/2022 | Minami ................ C22C 38/001 |
| 2016/0160335 A1 | 6/2016 | Muneaki |
| 2016/0369369 A1 | 12/2016 | Takashima et al. |
| 2017/0204490 A1 | 7/2017 | Kawasaki et al. |
| 2020/0190617 A1 | 6/2020 | Hasegawa et al. |
| 2022/0195552 A1 | 6/2022 | Minami et al. |

FOREIGN PATENT DOCUMENTS

| | | |
|---|---|---|
| CN | 106574340 A | 4/2017 |
| CN | 106574341 A | 4/2017 |
| CN | 107532266 A | 1/2018 |
| CN | 110121568 A | 8/2019 |
| EP | 3020842 A1 | 5/2016 |
| EP | 3392363 A1 | 10/2018 |
| JP | 2007302918 A | 11/2007 |
| JP | 2011225976 A | 11/2011 |
| JP | 2017145468 A | 8/2017 |
| KR | 1020100096840 A | 9/2010 |
| WO | 2013047760 A1 | 4/2013 |
| WO | 2016171237 A1 | 10/2016 |
| WO | 2018124157 A1 | 7/2018 |

OTHER PUBLICATIONS

Jul. 20, 2022, Office Action issued by the China National Intellectual Property Administration in the corresponding Chinese Patent Application No. 202080019932.4 with English language search report.

Apr. 20, 2022, the Extended European Search Report issued by the European Patent Office in the corresponding European Patent Application No. 20770785.2.

* cited by examiner

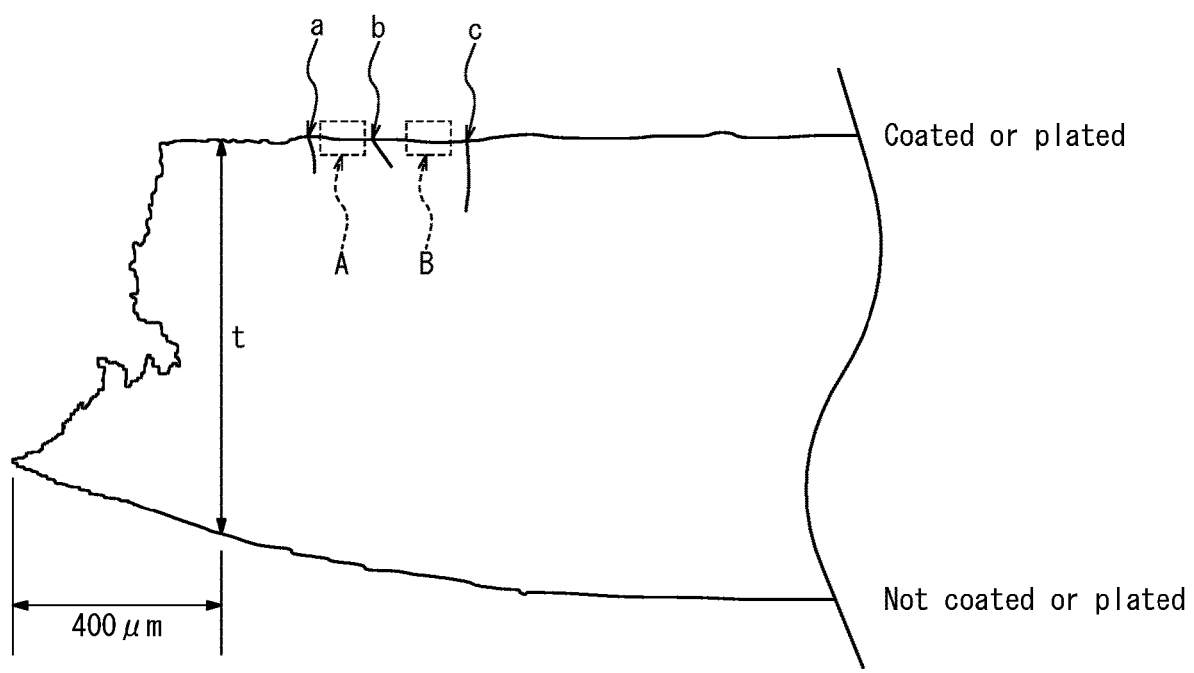

HIGH-STRENGTH STEEL SHEET AND METHOD FOR PRODUCING SAME

TECHNICAL FIELD

The present disclosure relates to a high-strength steel sheet and a method for producing the same.

BACKGROUND

To achieve both $CO_2$ emission reduction by weight reduction of vehicles and improvement in collision resistance by strengthening of vehicle bodies, attempts have been made to strengthen thin steel sheets for vehicles and also reduce their thicknesses. For example, there are growing instances in which high-strength steel sheets of 980 MPa or more in tensile strength (TS) are used in main structural parts forming the framework of the vehicle cabin for the purpose of increasing the strength of the vehicle body.

High-strength steel sheets used in reinforcing parts and framework structural parts of vehicles are required to have excellent formability. For example, parts such as a crash box have punched end surfaces and bend portions. For such parts, steel sheets having high ductility, stretch flangeability, and bendability are suitable from the viewpoint of formability.

High-strength steel sheets used in reinforcing parts and framework structural parts of vehicles are also required to enable production of parts with high dimensional accuracy. To produce parts with high dimensional accuracy, it is important to control the yield ratio (YR=yield strength YS/tensile strength TS) of a steel sheet to a certain range. As a result of the yield ratio (YR) of the steel sheet being controlled to the certain range, spring back after forming the steel sheet can be prevented, and the dimensional accuracy in forming can be enhanced. Moreover, as a result of increasing the yield ratio (YR) of the steel sheet, the impact absorbed energy of the parts upon collision can be increased.

To increase the use of high-strength steel sheets in automotive parts, high-strength steel sheets that comprehensively satisfy the foregoing properties are needed.

Various high-strength steel sheets have been conventionally developed for use in automotive parts. For example, JP 2007-302918 A (PTL 1) discloses the following high-strength steel sheet together with a method for producing the same: a high-strength steel sheet having a maximum tensile strength (TS) of 590 MPa or more and excellent hole expansion formability and formability, comprising, in volume fraction, ferrite: 40% or more and tempered martensite: 5% or more, wherein the ratio (DHTM/DHTF) between the hardness (DHTF) of ferrite and the hardness (DHTM) of martensite is 1.5 to 3.0, and residual microstructure consists of ferrite and bainite microstructure.

WO 2016/171237 A1 (PTL 2) discloses the following coated or plated steel sheet together with a method for producing the same: a coated or plated steel sheet having improved elongation and bendability while ensuring high strength, comprising, at a depth position of ¼ of the thickness of the steel sheet from the surface of the steel sheet, a microstructure containing, in volume fraction, tempered martensite: 3.0% or more, ferrite: 4.0% or more, and retained austenite: 5.0% or more, wherein the average hardness of tempered martensite in base metal is 5 GPa to 10 GPa, part or whole of tempered martensite and retained austenite in the base metal forms M-A, the volume fraction of ferrite in a decarburized ferrite layer is 120% or more of the volume fraction of ferrite in the base metal at the depth position of ¼ of the thickness of the steel sheet from the surface of the steel sheet, the average grain size of ferrite in the decarburized ferrite layer is 20 µm or less, the thickness of the decarburized ferrite layer is 5 µm to 200 µm, the volume fraction of tempered martensite in the decarburized ferrite layer is 1.0 vol % or more, the number density of tempered martensite in the decarburized ferrite layer is 0.01/µm$^2$ or more, and the average hardness of tempered martensite in the decarburized ferrite layer is 8 GPa or less.

Recently, it is recognized that, when spot welding a high-strength galvanized steel sheet, zinc in the galvanized layer diffusively enters the crystal grain boundaries in the surface layer of the steel sheet and causes liquid metal embrittlement (LME), as a result of which intergranular cracking (LME cracking) occurs. Even in a high-strength cold-rolled steel sheet without a galvanized layer, LME cracking can occur if the steel sheet is to be welded to a galvanized steel sheet. Thus, LME is increasingly considered problematic in all of these types of high-strength steel sheets. High-strength steel sheets used in framework parts are therefore required to have excellent LME resistance.

CITATION LIST

Patent Literature

PTL 1: JP 2007-302918 A
PTL 2: WO 2016/171237 A1

SUMMARY

Technical Problem

However, PTL 1 does not address bendability and LME resistance. PTL 2 does not address hole expansion formability and LME resistance. There is thus no steel sheet that comprehensively satisfies strength, ductility, stretch flangeability, bendability, and LME resistance and enables production of parts with high dimensional accuracy.

It could therefore be helpful to provide a high-strength steel sheet that has a tensile strength of 980 MPa or more and excellent ductility, stretch flangeability, bendability, and LME resistance and enables production of parts with high dimensional accuracy, and a method for producing the same.

Herein, "enabling production of parts with high dimensional accuracy" (i.e. high dimensional accuracy in forming) denotes that the YR is 50% or more and 80% or less. The YR is calculated according to the following formula (1):

$$YR=YS/TS \qquad (1).$$

Herein, "excellent ductility" denotes that the value of total elongation (El) which is an index of ductility is 20% or more.

Herein, "excellent stretch flangeability" denotes that the value of hole expansion ratio (λ) which is an index of stretch flangeability is 20% or more.

Herein, "excellent bendability" denotes that R/t is 2.0 or less, where R/t is a value obtained by dividing, by the thickness (t), the minimum bending radius (R) at which cracks of 200 µm or more in crack length are not recognized when performing a bend test by a V-block bend test with a bending angle of 90° and observing the ridgeline part of the tip of the bending test specimen using a microscope with 40 magnification.

Regarding the LME resistance, a fracture portion of a test piece after a high-temperature tensile test described in the EXAMPLES section is cut so that a thickness section (L section) parallel to the tensile direction of the test piece will be an observation surface, and the thickness section is observed to determine the thickness t at a position 400 μm away from the tensile fracture tip part. In the case where the thickness reduction calculated by substituting the thickness t into the following formula (2) is 0.20 or more, the steel sheet is determined to have excellent LME resistance:

$$\text{Thickness reduction} = (t_0 - t)/t_0 \quad (2),$$

where $t_0$ is the initial thickness of the notched tensile test piece before the tensile test, and t is the thickness at a position 400 μm away from the tensile fracture tip part toward the holding part. For example, in a L section of a fracture portion illustrated in FIG. 1, t is defined as illustrated in the drawing.

In the case where the thickness reduction is high, i.e. in the case where the steel sheet fractures after undergoing a large constriction in the tensile test, the steel sheet is determined to have excellent LME resistance.

Solution to Problem

We repeatedly conducted intensive studies to solve the problems stated above, and discovered the following:

(1) A high-strength steel sheet having a tensile strength of 980 MPa or more and excellent member dimensional accuracy and ductility can be realized by forming the microstructure mainly of ferrite which is soft phase and dispersing, in the microstructure, bainitic ferrite, bainite, tempered martensite, quenched martensite, and retained austenite which are hard phase.

(2) A high-strength steel sheet having excellent stretch flangeability can be realized by limiting the amount of diffusible hydrogen in the steel sheet to 0.80 mass ppm or less.

(3) A high-strength steel sheet having excellent bendability can be realized by reducing the content of Ca and the amount of diffusible hydrogen in the steel sheet and controlling the surface layer softening thickness to 5 μm or more and 150 μm or less.

(4) A high-strength steel sheet having excellent LME resistance can be realized by controlling the corresponding grain boundary frequency in the surface layer of the steel sheet after the high-temperature tensile test to 0.45 or less and the surface layer softening thickness to 5 μm or more and 150 μm or less.

The present disclosure is based on these discoveries. We thus provide:

[1] A high-strength steel sheet comprising: a chemical composition containing (consisting of), in mass %, C: 0.120% or more and 0.250% or less, Si: 0.80% or more and 2.00% or less, Mn: 1.50% or more and 2.45% or less, P: 0.001% or more and 0.100% or less, S: 0.0200% or less, Al: 0.010% or more and 1.000% or less, N: 0.0100% or less, Mo: 0.500% or less, Cr: 0.300% or less, Ca: 0.0200% or less, and Sb: 0.200% or less, with a balance consisting of Fe and inevitable impurities, wherein $\text{Mn}_{eq}$ calculated according to the following formula (1) is 2.40% or more and 3.40% or less, $$\text{Mn}_{eq} = 0.26 \times [\% \text{ Si}] + [\% \text{ Mn}] + 3.5 \times [\% \text{ P}] + 2.68 \times [\% \text{ Mo}] + 1.29 \times [\% \text{ Cr}] \quad (1)$$

where [% Si], [% Mn], [% P], [% Mo], and [% Cr] denotes content in mass % of Si, Mn, P, Mo, and Cr in steel, respectively, and is 0 in the case where each of Si, Mn, P, Mo, and Cr is not contained; a steel microstructure in which an area ratio of ferrite is 15% or more and 55% or less, an area ratio of hard phase is 40% or more and 85% or less, a volume fraction of retained austenite is 4% or more and 20% or less, a carbon concentration in the retained austenite is 0.55% or more and 1.10% or less, an amount of diffusible hydrogen in the steel sheet is 0.80 mass ppm or less, a surface layer softening thickness is 5 μm or more and 150 μm or less, and a corresponding grain boundary frequency in a surface layer of the steel sheet after a high-temperature tensile test is 0.45 or less; and a tensile strength of 980 MPa or more.

[2] The high-strength steel sheet according to [1], wherein an average minor axis length of the retained austenite is 2.0 μm or less.

[3] The high-strength steel sheet according to [1] or [2], wherein the chemical composition further contains, in mass %, at least one selected from the group consisting of Ti: 0.001% or more and 0.100% or less, Nb: 0.001% or more and 0.100% or less, V: 0.001% or more and 0.100% or less, B: 0.0001% or more and 0.0100% or less, Cu: 0.01% or more and 1.00% or less, Ni: 0.01% or more and 0.50% or less, Sn: 0.001% or more and 0.200% or less, Ta: 0.001% or more and 0.100% or less, Mg: 0.0001% or more and 0.0200% or less, Zn: 0.001% or more and 0.020% or less, Co: 0.001% or more and 0.020% or less, Zr: 0.001% or more and 0.020% or less, and REM: 0.0001% or more and 0.0200% or less.

[4] The high-strength steel sheet according to any one of [1] to [3], comprising a coating or plating layer at a surface thereof.

[5] A method for producing a high-strength steel sheet, the method comprising: subjecting a steel slab having the chemical composition according to [1] or [3] to hot rolling, to obtain a hot-rolled sheet; thereafter subjecting the hot-rolled sheet to pickling; thereafter subjecting the hot-rolled sheet to cold rolling under a condition that a rolling reduction in a final pass in the cold rolling is 1% or more and 5% or less and a rolling reduction in a pass immediately before the final pass is 5% or more and 30% or less, to obtain a cold-rolled sheet; thereafter subjecting the cold-rolled sheet to annealing that involves heating to a heating temperature of 740° C. or more and 880° C. or less in an atmosphere with a dew point of −35° C. or more and thereafter cooling to a cooling stop temperature of 150° C. or more and 300° C. or less under a condition that an average cooling rate from the heating temperature to 500° C. is 10° C./s or more; and thereafter reheating the cold-rolled sheet to a reheating temperature that is not less than a sum of the cooling stop temperature and 50° C. and is not more than 500° C., and holding the cold-rolled sheet at the reheating temperature for 10 s or more.

[6] The method for producing a high-strength steel sheet according to [5], comprising subjecting the cold-rolled sheet to preliminary annealing that involves heating to a heating temperature of 830° C. or more and cooling under a condition that an average cooling rate from the heating temperature to 500° C. is 5° C./s or more, after the cold rolling and before the annealing.

[7] The method for producing a high-strength steel sheet according to [6], comprising cooling the cold-rolled sheet to 50° C. or less and rolling the cold-rolled sheet at an elongation rate of 0.05% or more and 1.00% or less, after the preliminary annealing and before the annealing.

Advantageous Effect

It is thus possible to provide a high-strength steel sheet that has a tensile strength of 980 MPa or more and excellent ductility, stretch flangeability, bendability, and LME resistance and enables production of parts with high dimensional accuracy, and a method for producing the same.

BRIEF DESCRIPTION OF THE DRAWINGS

In the accompanying drawings:
FIG. 1 is a schematic diagram explaining the measurement of thickness reduction and the observation position of corresponding grain boundary frequency.

DETAILED DESCRIPTION

Disclosed embodiments will be described below. The present disclosure is not limited to the embodiments described below.

First, the appropriate range of the chemical composition of a steel sheet and the reasons for limiting the chemical composition to such range will be described below. In the following description, "%" with regard to the content of each element in the steel sheet is "mass %" unless otherwise specified.

C: 0.120% or More and 0.250% or Less

C is an element effective in forming a predetermined amount of bainitic ferrite, bainite, tempered martensite, quenched martensite, and retained austenite which are hard phase to achieve a TS of 980 MPa or more and excellent dimensional accuracy in forming. If the C content is less than 0.120%, the area ratio of hard phase and the volume fraction of retained austenite decrease, and the area ratio of ferrite increases. This makes it difficult to achieve a TS of 980 MPa or more, and also the ductility decreases. If the C content is more than 0.250%, the carbon concentration in hard phase increases excessively, and the hardness of hard phase increases, resulting in a greater difference in hardness between ferrite as soft phase and hard phase. Consequently, the void formation amount after punching increases, and the stretch flangeability decreases. The bendability decreases, too. The C content is therefore 0.120% or more and 0.250% or less. The C content is preferably 0.140% or more, and more preferably 0.150% or more. The C content is preferably 0.230% or less, and more preferably 0.220% or less.

Si: 0.80% or More and 2.00% or Less

Si is an element that suppresses the formation of carbide during annealing and facilitates the formation of retained austenite to thus influence the volume fraction of retained austenite and the carbon concentration in retained austenite. Moreover, by reducing the Si content, the corresponding grain boundary frequency in the surface layer of the steel sheet can be reduced to improve the LME resistance. If the Si content is less than 0.80%, the volume fraction of retained austenite decreases, and the ductility decreases. If the Si content is more than 2.00%, the carbon concentration in retained austenite increases excessively, and the hardness of martensite generated from retained austenite during punching increases greatly. Consequently, crack propagation during hole expansion is facilitated, and the stretch flangeability decreases. The bendability decreases, too. Further, since the corresponding grain boundary frequency increases, the LME resistance decreases. The Si content is therefore 0.80% or more and 2.00% or less. The Si content is preferably 0.90% or more, and more preferably 1.00% or more. The Si content is preferably 1.80% or less, and more preferably 1.70% or less.

Mn: 1.50% or More and 2.45% or Less

Mn is one of the important basic components of steel. Particularly in the present disclosure, Mn is an important element that influences the area ratio of hard phase. If the Mn content is less than 1.50%, the area ratio of hard phase decreases, and the area ratio of ferrite increases, making it difficult to achieve a TS of 980 MPa or more. If the Mn content is more than 2.45%, the area ratio of hard phase increases, and the dimensional accuracy in forming and the ductility decrease. The Mn content is therefore 1.50% or more and 2.45% or less. The Mn content is preferably 1.70% or more, and more preferably 1.80% or more. The Mn content is preferably 2.40% or less, and more preferably 2.30% or less.

P: 0.001% or More and 0.100% or Less

P is an element that has a solid solution strengthening effect and can increase the strength of the steel sheet. To achieve this effect, the P content is 0.001% or more. If the P content is more than 0.100%, P segregates to the prior austenite grain boundaries and embrittles the grain boundaries. Consequently, the void formation amount after punching increases, and the stretch flangeability decreases. The bendability decreases, too. The P content is therefore 0.001% or more and 0.100% or less. The P content is preferably 0.002% or more, and more preferably 0.003% or more. The P content is preferably 0.050% or less, and more preferably 0.030% or less.

S: 0.0200% or Less

S exists as sulfide in the steel. If the S content is more than 0.0200%, the ultimate deformability of the steel sheet decreases. Consequently, the void formation amount after punching increases, and the stretch flangeability decreases. The bendability decreases, too. The S content is therefore 0.0200% or less. Although no lower limit is placed on the S content, the S content is preferably 0.0001% or more in terms of constraints on production technology. The S content is preferably 0.0040% or less.

Al: 0.010% or More and 1.000% or Less

Al is an element that suppresses the formation of carbide during annealing and facilitates the formation of retained austenite to thus influence the volume fraction of retained austenite and the carbon concentration in retained austenite. To achieve this effect, the Al content is 0.010% or more. If the Al content is more than 1.000%, a large amount of ferrite forms, and the dimensional accuracy in forming decreases. The Al content is therefore 0.010% or more and 1.000% or less. The Al content is preferably 0.015% or more, and more preferably 0.020% or more. The Al content is preferably 0.100% or less, and more preferably 0.070% or less.

N: 0.0100% or Less

N exists as nitride in the steel. If the N content is more than 0.0100%, the ultimate deformability of the steel sheet decreases. Consequently, the void formation amount after punching increases, and the stretch flangeability decreases. The bendability decreases, too. The N content is therefore 0.0100% or less. Although no lower limit is placed on the N content, the N content is preferably 0.0005% or more in terms of constraints on production technology. The N content is preferably 0.0050% or less.

Mo: 0.500% or Less

Mo is an element that improves the hardenability and is effective in forming hard phase. If the Mo content is more than 0.500%, the area ratio of hard phase increases, and the dimensional accuracy in forming and the ductility decrease.

The Mo content is therefore 0.500% or less. Although the lower limit of the Mo content may be 0.000%, the Mo content is preferably 0.010% or more from the viewpoint of increasing the hardenability and limiting the TS to the more preferred range. The Mo content is preferably 0.300% or less, and more preferably 0.100% or less. The Mo content is more preferably 0.030% or more.

Cr: 0.300% or Less

Cr is an element that improves the hardenability and is effective in forming hard phase. If the Cr content is more than 0.300%, the area ratio of hard phase increases, and the dimensional accuracy in forming and the ductility decrease. The Cr content is therefore 0.300% or less. Although the lower limit of the Cr content may be 0.000%, the Cr content is preferably 0.010% or more from the viewpoint of increasing the hardenability and limiting the TS to the more preferred range. The Cr content is preferably 0.250% or less, and more preferably 0.100% or less.

Ca: 0.0200% or Less

Ca exists as an inclusion in the steel. If the Ca content is more than 0.0200%, in the case where the steel sheet contains diffusible hydrogen, the inclusion becomes a crack initiation point in a bend test, as a result of which the bendability decreases. The Ca content is therefore 0.0200% or less. Although the lower limit of the Ca content may be 0.0000%, the Ca content is preferably 0.0001% or more in terms of constraints on production technology. The Ca content is preferably 0.0020% or less.

Sb: 0.200% or Less

This is a very important constituent feature in the present disclosure. Sb is an element effective in controlling the surface layer softening thickness by suppressing the oxidation of the steel sheet surface during annealing. Sb can also reduce the corresponding grain boundary frequency in the surface layer of the steel sheet, by suppressing the nitriding of the surface layer of the steel sheet during annealing. If the Sb content is more than 0.200%, a surface layer softening portion cannot be formed, so that the bendability and the LME resistance decrease. The Sb content is therefore 0.200% or less. Although the lower limit of the Sb content may be 0.000%, the Sb content is preferably 0.001% or more in order to reduce the corresponding grain boundary frequency and achieve better LME resistance. The Sb content is more preferably 0.002% or more, and further preferably 0.005% or more. The Sb content is preferably 0.050% or less, and more preferably 0.020% or less.

$Mn_{eq}$: 2.40% or More and 3.40% or Less

This is a very important constituent feature in the present disclosure. $Mn_{eq}$ is an effective parameter to control the area ratio of hard phase, limit the TS to 980 MPa or more, achieve excellent dimensional accuracy in forming, and also achieve excellent ductility. If $Mn_{eq}$ is less than 2.40%, the area ratio of hard phase decreases, and the area ratio of ferrite increases, making it difficult to limit the TS to 980 MPa or more. If $Mn_{eq}$ is more than 3.40%, the area ratio of hard phase increases, and the area ratio of ferrite decreases, as a result of which the dimensional accuracy in forming and the ductility decrease. $Mn_{eq}$ is therefore 2.40% or more and 3.40% or less. $Mn_{eq}$ is preferably 2.50% or more, and more preferably 2.55% or more. $Mn_{eq}$ is preferably 3.30% or less, and more preferably 3.20% or less.

$Mn_{eq}$ is calculated according to the following formula (1):

$$Mn_{eq}=0.26\times[\% \text{ Si}]+[\% \text{ Mn}]+3.5\times[\% \text{ P}]+2.68\times[\% \text{ Mo}]+1.29\times[\% \text{ Cr}] \quad (1)$$

where [% Si], [% Mn], [% P], [% Mo], and [% Cr] denotes the content (mass %) of Si, Mn, P, Mo, and Cr in the steel, respectively, and is 0 in the case where the steel does not contain any Si, Mn, P, Mo, or Cr.

[Optional Components]

In addition to the foregoing chemical composition, the high-strength steel sheet according to the present disclosure preferably further contains, in mass %, at least one selected from the group consisting of Ti: 0.001% or more and 0.100% or less, Nb: 0.001% or more and 0.100% or less, V: 0.001% or more and 0.100% or less, B: 0.0001% or more and 0.0100% or less, Cu: 0.01% or more and 1.00% or less, Ni: 0.01% or more and 0.50% or less, Sn: 0.001% or more and 0.200% or less, Ta: 0.001% or more and 0.100% or less, Mg: 0.0001% or more and 0.0200% or less, Zn: 0.001% or more and 0.020% or less, Co: 0.001% or more and 0.020% or less, Zr: 0.001% or more and 0.020 or less, and REM: 0.0001% or more and 0.0200% or less.

Ti, Nb, and V increase the TS by forming fine carbide, nitride, or carbonitride during hot rolling or annealing. To achieve this effect, the content of each of one or more of Ti, Nb, and V is 0.001% or more. If the content of each of one or more of Ti, Nb, and V is more than 0.100%, a large amount of coarse precipitate or inclusion forms. In the case where the steel sheet contains diffusible hydrogen, the precipitate or inclusion becomes a crack initiation point in a bend test, as a result of which the bendability decreases. Accordingly, in the case of adding one or more of Ti, Nb, and V, the content of each of the one or more of Ti, Nb, and V is 0.001% or more and 0.100% or less. In the case of adding one or more of Ti, Nb, and V, the content of each of the one or more of Ti, Nb, and V is preferably 0.005% or more. In the case of adding one or more of Ti, Nb, and V, the content of each of the one or more of Ti, Nb, and V is preferably 0.060% or less.

B is an element that can improve the hardenability by segregating to the austenite grain boundaries. Adding B into the steel can suppress the formation and grain growth of ferrite during annealing cooling. To achieve this effect, the B content is 0.0001% or more. If the B content is more than 0.0100%, cracking occurs inside the steel sheet during hot rolling, causing a decrease in the ultimate deformability of the steel sheet. Consequently, the total void number density after punching increases, and the stretch flangeability decreases. The bendability decreases, too. Accordingly, in the case of adding B, the B content is 0.0001% or more and 0.0100% or less. In the case of adding B, the B content is preferably 0.0002% or more. In the case of adding B, the B content is preferably 0.0050% or less.

Cu is an element that increases the hardenability. Cu is effective in limiting the area ratio of hard phase to the more preferred range, limiting the TS to the more preferred range, and further improving the dimensional accuracy in forming. To achieve these effects, the Cu content is 0.01% or more. If the Cu content is more than 1.00%, the area ratio of hard phase increases, and the dimensional accuracy in forming and the ductility decrease. Moreover, coarse precipitate or inclusion increases. In the case where the steel sheet contains diffusible hydrogen, the precipitate or inclusion becomes a crack initiation point in a bend test, as a result of which the bendability decreases. Accordingly, in the case of adding Cu, the Cu content is 0.01% or more and 1.00% or less. In the case of adding Cu, the Cu content is preferably 0.02% or more. In the case of adding Cu, the Cu content is preferably 0.20% or less.

Ni is an element that increases the hardenability. Ni is effective in limiting the area ratio of hard phase to the more preferred range, limiting the TS to the more preferred range, and further improving the dimensional accuracy in forming.

To achieve these effects, the Ni content is 0.01% or more. If the Ni content is more than 0.50%, the area ratio of hard phase increases, and the dimensional accuracy in forming and the ductility decrease. Moreover, coarse precipitate or inclusion increases. In the case where the steel sheet contains diffusible hydrogen, the precipitate or inclusion becomes a crack initiation point in a bend test, as a result of which the bendability decreases. Accordingly, in the case of adding Ni, the Ni content is 0.01% or more and 0.50% or less. In the case of adding Ni, the Ni content is preferably 0.02% or more. In the case of adding Ni, the Ni content is preferably 0.20% or less.

Sn is an element effective in controlling the surface layer softening thickness more preferably by suppressing the oxidation of the steel sheet surface during annealing. To achieve this effect, the Sn content is 0.001% or more. If the Sn content is more than 0.200%, coarse precipitate or inclusion increases. In the case where the steel sheet contains diffusible hydrogen, the precipitate or inclusion becomes a crack initiation point in a bend test, as a result of which the bendability decreases. Accordingly, in the case of adding Sn, the Sn content is 0.001% or more and 0.200% or less. In the case of adding Sn, the Sn content is preferably 0.005% or more. In the case of adding Sn, the Sn content is preferably 0.050% or less.

Ta increases the TS by forming fine carbide, nitride, or carbonitride during hot rolling or annealing, as with Ti, Nb, and V. Ta is also considered to have an effect of improving the strength of the steel sheet by partially dissolving in Nb carbide or Nb carbonitride and forming a composite precipitate such as (Nb, Ta)(C, N) to thereby significantly suppress the coarsening of the precipitate and stabilizing the strengthening by precipitation. To achieve these effects, the Ta content is 0.001%. If the Ta content is more than 0.100%, a large amount of coarse precipitate or inclusion forms. In the case where the steel sheet contains diffusible hydrogen, the precipitate or inclusion becomes a crack initiation point in a bend test, as a result of which the bendability decreases. Accordingly, in the case of adding Ta, the Ta content is 0.001% or more and 0.100% or less. In the case of adding Ta, the Ta content is preferably 0.005% or more. In the case of adding Ta, the Ta content is preferably 0.020% or less.

Mg is an element effective in spheroidizing the shape of inclusions such as sulfide or oxide to improve the ultimate deformability of the steel sheet and improve the stretch flangeability. To achieve this effect, the Mg content is 0.0001% or more. If the Mg content is more than 0.0200%, a large amount of coarse precipitate or inclusion forms. In the case where the steel sheet contains diffusible hydrogen, the precipitate or inclusion becomes a crack initiation point in a bend test, as a result of which the bendability decreases. Accordingly, in the case of adding Mg, the Mg content is 0.0001% or more and 0.0200% or less. In the case of adding Mg, the Mg content is preferably 0.0005% or more. In the case of adding Mg, the Mg content is preferably 0.0050% or less.

Zn, Co, and Zr are each an element effective in spheroidizing the shape of inclusions to improve the ultimate deformability of the steel sheet and improve the stretch flangeability. To achieve this effect, the content of each of one or more of Zn, Co, and Zr is 0.001% or more. If the content of each of one or more of Zn, Co, and Zr is more than 0.020%, a large amount of coarse precipitate or inclusion forms. In the case where the steel sheet contains diffusible hydrogen, the precipitate or inclusion becomes a crack initiation point in a bend test, as a result of which the bendability decreases. Accordingly, in the case of adding one or more of Zn, Co, and Zr, the content of each of the one or more of Zn, Co, and Zr is 0.0001% or more and 0.020% or less. In the case of adding one or more of Zn, Co, and Zr, the content of each of the one or more of Zn, Co, and Zr is preferably 0.002% or more. In the case of adding one or more of Zn, Co, and Zr, the content of each of the one or more of Zn, Co, and Zr is preferably 0.010% or less.

REM is an element effective in spheroidizing the shape of inclusions to improve the ultimate deformability of the steel sheet and improve the stretch flangeability. To achieve this effect, the REM content is 0.0001% or more. If the REM content is more than 0.0200%, a large amount of coarse precipitate or inclusion forms. In the case where the steel sheet contains diffusible hydrogen, the precipitate or inclusion becomes a crack initiation point in a bend test, as a result of which the bendability decreases. Accordingly, in the case of adding REM, the REM content is 0.0001% or more and 0.0200% or less. In the case of adding REM, the REM content is preferably 0.0010% or more. In the case of adding REM, the REM content is preferably 0.0100% or less.

The balance other than the components described above consists of Fe and inevitable impurities. Regarding the foregoing optional components, if their contents are less than the lower limits, the effects according to the present disclosure are not undermined. Hence, in the case where the chemical composition contains such optional elements below the lower limits, these elements are treated as inevitable impurities.

The steel microstructure of the high-strength steel sheet according to the present disclosure will be described below.

Area Ratio of Ferrite: 15% or More and 55% or Less

As a result of the microstructure being mainly formed of ferrite which is soft phase, the YR can be controlled to a desired range. Hence, excellent dimensional accuracy in forming can be achieved, and excellent ductility can be achieved. Moreover, given that ferrite has low solid solubility of hydrogen, forming the microstructure mainly of ferrite can reduce the amount of diffusible hydrogen in the steel sheet. Consequently, the void formation amount after punching decreases, and the stretch flangeability is improved. The bendability is improved, too. To achieve these effects, the area ratio of ferrite is 15% or more. If the area ratio of ferrite is more than 55%, it is difficult to limit the TS to 980 MPa or more. Accordingly, the area ratio of ferrite is 15% or more and 55% or less. The area ratio of ferrite is preferably 19% or more, and more preferably 22% or more. The area ratio of ferrite is preferably 51% or less, and more preferably 48% or less.

Area Ratio of Hard Phase: 40% or More and 85% or Less

As a result of 40% or more in total bainitic ferrite, bainite, tempered martensite, and quenched martensite which are hard phase being contained, the TS can be limited to 980 MPa or more, and excellent dimensional accuracy in forming can be achieved. If the area ratio of hard phase is more than 85%, the dimensional accuracy in forming and the ductility decrease. Moreover, the amount of diffusible hydrogen in the steel sheet increases, and the stretch flangeability decreases. The bendability decreases, too. Accordingly, the area ratio of hard phase is 40% or more and 85% or less. The area ratio of hard phase is preferably 45% or more, more preferably 49% or more, and further preferably 52% or more. The area ratio of hard phase is preferably 81% or less, and more preferably 78% or less.

A method of measuring the area ratio of ferrite and the area ratio of hard phase is as follows:

After cutting out a sample so that a thickness section (L section) parallel to the rolling direction of the steel sheet will be an observation surface, the observation surface is polished with diamond paste. The observation surface is then finish-polished using alumina. The observation surface is measured for four observation fields using an electron probe microanalyzer (EPMA) with an accelerating voltage of 7 kV, where the measurement region is 45 μm×45 μm. Data obtained as a result of the measurement is converted into carbon concentration by a calibration curve method using a standard sample. The data of the four observation fields is summed. The area ratio of ferrite and the area ratio of hard phase are calculated based on the definition that each region having a carbon concentration of 0.5×[% C] or less is ferrite and each region having a carbon concentration of more than 0.5×[% C] and less than 3.2×[% C] is hard phase, where [% C] is the carbon concentration in the steel.

Volume Fraction of Retained Austenite: 4% or More and 20% or Less

As a result of 4% or more retained austenite being contained, excellent ductility can be achieved. If the volume fraction of retained austenite is more than 20%, voids form inside martensite when retained austenite is worked in punching or a bend test and transforms into martensite, because retained austenite has high hydrogen concentration. Thus, the void formation amount after punching increases, and the stretch flangeability decreases. Moreover, since voids formed inside martensite in the bend test become a crack initiation point, the bendability decreases, too. Accordingly, the volume fraction of retained austenite is 4% or more and 20% or less. The volume fraction of retained austenite is preferably 5% or more, and more preferably 6% or more. The volume fraction of retained austenite is preferably 18% or less, and more preferably 16% or less.

Carbon Concentration in Retained Austenite: 0.55% or More and 1.10% or Less

As a result of the carbon concentration in retained austenite being 0.55% or more, excellent ductility can be achieved, and excellent dimensional accuracy in forming can be achieved. If the carbon concentration in retained austenite is more than 1.10%, the hardness of martensite formed from retained austenite in punching increases greatly. Hence, crack propagation during hole expansion is facilitated, and the stretch flangeability decreases. The bendability decreases, too. Accordingly, the carbon concentration in retained austenite is 0.55% or more and 1.10% or less. The carbon concentration in retained austenite is preferably 0.60% or more, and more preferably 0.65% or more. The carbon concentration in retained austenite is preferably 1.00% or less, more preferably 0.95% or less, and further preferably 0.90% or less.

A method of measuring the volume fraction of retained austenite is as follows:

After mechanically grinding the steel sheet to ¼ of the thickness in the thickness direction (depth direction), chemical polishing with oxalic acid is performed to obtain an observation surface. The observation surface is observed by an X-ray diffraction method. As the incident X-ray, a Kα-ray source of Co is used. The ratio of the diffraction intensity of each of the (200), (220), and (311) planes of fcc iron (austenite) to the diffraction intensity of each of the (200), (211), and (220) planes of bcc iron is calculated and taken to be the volume fraction of retained austenite.

A method of measuring the carbon concentration in retained austenite is as follows:

First, the lattice constant of retained austenite is calculated from the shift amount of the diffraction peak of the (220) plane of austenite, according to the following formula (3):

$$a = 1.79021\sqrt{2}/\sin\theta \quad (3).$$

The obtained lattice constant a of retained austenite and the content (mass %) of element M with respect to the entire steel are substituted into the following formula (4), to calculate the carbon concentration [% C] in retained austenite:

$$a = 3.578 + 0.00095[\% \text{ Mn}] + 0.022[\% \text{ N}] + 0.0006[\% \text{ Cr}] + 0.0031[\% \text{ Mo}] + 0.0051[\% \text{ Nb}] + 0.0039[\% \text{ Ti}] + 0.0056[\% \text{ Al}] + 0.033[\% \text{ C}] \quad (4),$$

where a is the lattice constant (Å) of retained austenite, θ is the value (rad) obtained by dividing the diffraction peak angle of the (220) plane by 2, and [% C] is the content (mass %) of C in retained austenite. [% M] other than [% C] is the content (mass %) of element M with respect to the entire steel.

Average Minor Axis Length of Retained Austenite: 2.0 μm or Less

The average minor axis length of retained austenite is preferably 2.0 μm or less. As a result of the average minor axis length of retained austenite being 2.0 μm or less, the void formation amount after punching decreases, so that the stretch flangeability can be further improved. No lower limit is placed on the average minor axis length of retained austenite. However, if the average minor axis length of retained austenite is less than 0.2 μm, retained austenite does not undergo martensite transformation even in the later stage of tensile deformation, and consequently its contribution to the ductility decreases. Accordingly, the average minor axis length of retained austenite is preferably 0.2 μm or more. The average minor axis length of retained austenite is more preferably 1.9 μm or less, further preferably 1.6 μm or less, and still further preferably 1.0 μm or less.

A method of measuring the average minor axis length of retained austenite is as follows:

After cutting out a sample so that a thickness section (L section) parallel to the rolling direction of the steel sheet will be an observation surface, the observation surface is polished with diamond paste. The observation surface is then finish-polished using alumina. The observation surface is then etched with 1 vol % nital. The part of the steel sheet at a position of ¼ of the thickness (a position of ¼ of the thickness in the depth direction from the steel sheet surface) is observed for three observation fields using a scanning electron microscope (SEM) with 5000 magnification. A resultant microstructure image is analyzed using Adobe Photoshop produced by Adobe Systems Inc., and the minor axis length of retained austenite is calculated for the three observation fields. The minor axis length of retained austenite for the three observation fields is averaged, and taken to be the average minor axis length of retained austenite. In the microstructure image, retained austenite exhibits fine white microstructure with an average crystal grain size of 5.0 μm or less, and thus the identification and the measurement of the minor axis length are possible.

The steel microstructure according to the present disclosure may contain, in addition to the foregoing ferrite, bainitic ferrite, bainite, tempered martensite, quenched martensite, and retained austenite, other microstructures known as microstructures in steel sheets, e.g. carbides such as pearlite and cementite, within a range of 3% or less in area ratio, without undermining the effects according to the present disclosure. Other microstructures (residual microstructures) in the steel sheet can be observed and determined through, for example, SEM observation.

Amount of Diffusible Hydrogen in Steel Sheet: 0.80 Mass Ppm or Less

This is a very important constituent feature in the present disclosure. We repeatedly conducted intensive studies to realize a high-strength steel sheet having excellent stretch flangeability, and discovered that the amount of diffusible hydrogen in the steel sheet is related to the stretch flangeability and the bendability. Through further studies, we discovered that excellent stretch flangeability and bendability can be achieved by reducing the amount of diffusible hydrogen in the steel sheet to 0.80 mass ppm or less. Although no lower limit is placed on the amount of diffusible hydrogen in the steel sheet, the amount of diffusible hydrogen in the steel sheet is preferably 0.01 mass ppm or more in terms of constraints on production technology. The amount of diffusible hydrogen in the steel sheet is more preferably 0.05 mass ppm or more. The amount of diffusible hydrogen in the steel sheet is preferably 0.60 mass ppm or less, and more preferably 0.35 mass ppm or less. The steel sheet from which the amount of diffusible hydrogen is measured may be a high-strength steel sheet before coating or plating treatment, or a base metal steel sheet of a high-strength hot-dip galvanized steel sheet after coating or plating treatment and before working. The steel sheet from which the amount of diffusible hydrogen is measured may be a base metal steel sheet of a steel sheet after coating or plating treatment and working such as punching, elongation flanging, or bending, or a base metal steel sheet portion of a product yielded by welding a worked steel sheet.

A method of measuring the amount of diffusible hydrogen in the steel sheet is as follows. In the case where the steel sheet is a high-strength steel sheet without a coating or plating layer, a test piece with a length of 30 mm and a width of 5 mm is collected. In the case where the steel sheet is a high-strength hot-dip galvanized steel sheet, a test piece with a length of 30 mm and a width of 5 mm is collected, and its hot-dip galvanizing layer or galvannealing layer is alkali-removed. After this, the amount of hydrogen emitted from the test piece is measured by a thermal desorption analysis method. Specifically, after continuously heating the test piece at a heating rate of 200° C./h from room temperature to 300° C., the test piece is cooled to room temperature. The cumulative amount of hydrogen emitted from the test piece from room temperature to 210° C. is measured and taken to be the amount of diffusible hydrogen in the steel sheet.

Surface Layer Softening Thickness: 5 μm or More and 150 μm or Less

As a result of the surface layer of the steel sheet being softened as compared with a position of ¼ of the thickness, excellent bendability and LME resistance can be achieved. To achieve this effect, the thickness of the surface layer softening portion (surface layer softening thickness) is 5 μm or more. Meanwhile, to achieve a TS of 980 MPa or more, the surface layer softening thickness is 150 μm or less. The surface layer softening thickness is therefore 5 μm or more and 150 μm or less. The surface layer softening thickness is preferably 10 μm or more, and more preferably 15 μm or more. The surface layer softening thickness is preferably 110 μm or less, and more preferably 80 μm or less.

A method of measuring the surface layer softening thickness is as follows:

A thickness section (L section) parallel to the rolling direction of the steel sheet is smoothed by wet polishing, and then measurement is performed using a Vickers hardness meter with a load of 10 gf at 5 μm intervals from a position of 5 μm in the thickness direction to a position of 100 μm in the thickness direction from the surface. After this, measurement is performed at 20 μm intervals to the center in the thickness direction. A region whose hardness is 95% or less of the hardness at the position of ¼ of the thickness is taken to be a softening region, and the thickness of the part from the surface layer of the steel sheet to the softening region in the thickness direction is defined as the surface layer softening thickness.

Corresponding Grain Boundary Frequency in Surface Layer of Steel Sheet after High-Temperature Tensile Test: 0.45 or Less This is a very important constituent feature in the present disclosure. As a result of the corresponding grain boundary frequency in the surface layer of the steel sheet after a high-temperature tensile test being reduced to 0.45 or less, the number of corresponding grain boundaries where LME cracking propagates preferentially can be reduced, so that excellent LME resistance can be achieved. Although no lower limit is placed on the corresponding grain boundary frequency in the surface layer of the steel sheet after the high-temperature tensile test, the corresponding grain boundary frequency in the surface layer of the steel sheet after the high-temperature tensile test is typically 0.05 or more. The corresponding grain boundary frequency in the surface layer of the steel sheet after the high-temperature tensile test is preferably 0.15 or more. The corresponding grain boundary frequency in the surface layer of the steel sheet after the high-temperature tensile test is preferably 0.40 or less, and more preferably 0.35 or less.

A method of calculating the corresponding grain boundary frequency in the surface layer of the steel sheet after the high-temperature tensile test is as follows:

A sample for corresponding grain boundary frequency measurement is collected by cutting to include a fracture portion of the test piece after the high-temperature tensile test described in the EXAMPLES section so that a thickness section (L section) parallel to the tensile direction of the test piece will be an observation surface. After smoothing the thickness section of the sample for corresponding grain boundary frequency measurement by buffing using a diamond paste and an alumina paste, a worked layer is completely removed by ion milling. Next, the crystal orientation is measured using FE-SEM/EBSD (JSM7100F produced by JEOL Ltd., OIM produced by TSL Solutions KK.), for the surface layer of the steel sheet on the side joined to a coated or plated steel sheet in the case where the sample steel is a cold-rolled steel sheet, and for the surface layer of the steel sheet on the coating or plating layer side in the case where the sample steel is a coated or plated steel sheet. The EBSD measurement is conducted under measurement conditions (observation position: LME cracking portion vicinity, measurement observation field: 60 μm (tensile direction)×40 μm (crack propagation direction), measurement point interval: 40 nm) sufficient to evaluate the substructure of martensite based on crystal orientation. Herein, the LME cracking portion vicinity denotes an intermediate region between a plurality of cracks (LME cracks) that occur on the steel sheet surface after the high-temperature tensile test. In the example in FIG. 1, an intermediate region A between cracks a and b and an intermediate region B between cracks b and c are each a LME cracking portion vicinity. In the case where there are a plurality of LME cracking portion vicinities as in the example in FIG. 1, the corresponding grain boundary frequency may be observed in any of the LME cracking portion vicinities. For the obtained EBSD observation result, the characteristics of all grain boundaries in the surface layer of the steel sheet in the measurement observation field are examined. Following this, from the number of grain boundaries having the relationship of corresponding grain boundaries in the surface layer of the steel sheet in the measurement observation field and the total number of grain boundaries in the surface layer of the steel sheet in the measurement observation field, the corresponding grain boundary frequency in the surface layer of the steel sheet is calculated according to the following formula:

[the corresponding grain boundary frequency in the surface layer of the steel sheet after the high-temperature tensile test]=[the number of grain boundaries having the relationship of corresponding grain boundaries in the surface layer of the steel sheet in the measurement observation field]/[the total number of grain boundaries in the surface layer of the steel sheet in the measurement observation field].

Herein, "corresponding grain boundary" is defined as a low ΣCSL (coincident site lattice) grain boundary of Σ23 or less.

The high-strength steel sheet according to the present disclosure has a tensile strength (TS) of 980 MPa or more.

The TS is measured in accordance with JIS Z 2241 in the following manner: A JIS No. 5 test piece is collected from the high-strength steel sheet so that its longitudinal direction will be perpendicular to the rolling direction of the steel sheet. Using the test piece, a tensile test is conducted with a crosshead displacement rate Vc of $1.67 \times 10^{-1}$ mm/s, to measure the TS.

The high-strength steel sheet according to the present disclosure may have a coating or plating layer at its surface. The composition of the coating or plating layer is not limited, and may be a typical composition. The coating or plating layer may be formed by any method. For example, the coating or plating layer may be a hot-dip coating layer or an electroplating layer. The coating or plating layer may be alloyed.

The coating or plating layer is preferably a hot-dip galvanizing layer. The composition of the hot-dip galvanizing layer is not limited. In an example, the coating or plating layer has a composition containing Fe: 20 mass % or less, Al: 0.001 mass % or more and 1.0 mass % or less, and one or more selected from the group consisting of Pb, Sb, Si, Sn, Mg, Mn, Ni, Cr, Co, Ca, Cu, Li, Ti, Be, Bi, and REM: 0 mass % or more and 3.5 mass % or less in total, with the balance consisting of Zn and inevitable impurities. In the case where the coating or plating layer is a hot-dip galvanizing layer, the Fe content in the coating or plating layer is less than 7 mass %. In the case where the coating or plating layer is a galvannealing layer, the Fe content in the coating or plating layer is 7 mass % to 15 mass %, and more preferably 8 mass % to 13 mass %.

As the coating or plating layer, a hot-dip zinc-aluminum-magnesium alloy coating (Zn—Al—Mg coating layer) is also preferable. The composition of the Zn—Al—Mg coating layer is not limited, but a composition containing Al: 1 mass % or more and 22 mass % or less and Mg: 0.1 mass % or more and 10 mass % or less with the balance consisting of Zn and inevitable impurities is preferable. The Zn—Al—Mg coating layer may contain one or more selected from the group consisting of Si, Ni, Ce, and La: 1 mass % or less in total, in addition to Zn, Al, and Mg. The coating or plating layer may be composed mainly of any metal. For example, an Al coating or plating layer may be used.

The coating weight is not limited, but the coating weight per one side of the base metal steel sheet is preferably 20 g/m² to 80 g/m².

The coating or plating layer preferably has cracks. As a result of the coating or plating layer having cracks, the amount of diffusible hydrogen in the base metal steel sheet can be reduced to the more preferred range. Consequently, the stretch flangeability and the bendability can be improved.

Whether the coating or plating layer has cracks is determined in the following manner: The coating or plating layer formed at the base metal steel sheet surface is observed for two observation fields on each of the front and back sides of the base metal steel sheet, i.e. four observation fields in total, using a SEM with 1500 magnification. In the case where one or more cracks of 10 μm or more in length are found in any of the four observation fields, the coating or plating layer is determined to have cracks.

The thickness of the high-strength steel sheet according to the present disclosure is not limited, but is typically 0.3 mm or more and 2.8 mm or less.

A method for producing a high-strength steel sheet according to one of the disclosed embodiments will be described below.

Embodiment 1

First, a steel slab having the foregoing chemical composition is produced. A steel material is subjected to steelmaking to obtain molten steel having the foregoing chemical composition. The steelmaking method is not limited, and may be any known steelmaking method such as converter steelmaking or electric heating furnace steelmaking. The obtained molten steel is solidified to produce a steel slab (slab). The method of producing the steel slab from the molten steel is not limited, and may be continuous casting, ingot casting, thin slab casting, or the like. To prevent macrosegregation, the steel slab is preferably produced by continuous casting.

The produced steel slab is then subjected to hot rolling composed of rough rolling and finish rolling, to obtain a hot-rolled sheet.

In an example, the steel slab produced as described above is cooled to room temperature and then heated, before rolling. The slab heating temperature is preferably 1100° C. or more, from the viewpoint of melting carbide and reducing the rolling load. To prevent an increase of scale loss, the slab heating temperature is preferably 1300° C. or less. The slab heating temperature is based on the temperature of the slab surface during heating.

The hot rolling may be performed using an energy-saving process. Examples of the energy-saving process include hot direct rolling whereby the produced steel slab as a warm slab is, without being cooled to room temperature, charged into a heating furnace and hot rolled, and direct rolling whereby the produced steel slab is rolled immediately after being subjected to heat retention for a short period.

The steel slab is then subjected to rough rolling under typical conditions to be formed into a sheet bar. The sheet bar is subjected to finish rolling to obtain a hot-rolled sheet. In the case where the heating temperature of the slab is low, the sheet bar is preferably heated using a bar heater or the like prior to finish rolling in order to prevent troubles during finish rolling. The finish rolling temperature is preferably $Ar_3$ transformation point or more, in order to reduce the rolling load and also in view of the possibility that, if the rolling reduction in a non-recrystallized state of austenite is high, abnormal microstructure extending in the rolling direction develops, causing a decrease in the workability of the annealed sheet. The finish rolling temperature is therefore preferably $Ar_3$ transformation point or more. After the finish rolling, the hot-rolled sheet is coiled and collected. The coiling temperature is preferably 300° C. or more and 700° C. or less, from the viewpoint of the formability of the annealed sheet.

The finish rolling may be performed continuously by joining rough-rolled sheets in the hot rolling. Rough-rolled sheets (sheet bars) may be coiled on a temporary basis, before the finish rolling. At least part of the finish rolling may be conducted as lubrication rolling to reduce the rolling load in the hot rolling. Such lubrication rolling is effective from the viewpoint of making the shape and material properties of the steel sheet uniform. The coefficient of friction in the lubrication rolling is preferably in a range of 0.10 to 0.25.

The hot-rolled sheet is then subjected to pickling. The pickling enables removal of oxides from the steel sheet surface, and is thus important to ensure favorable chemical convertibility and coating quality in the high-strength steel sheet as the finished product. The pickling may be performed only once, or a plurality of times.

The hot-rolled sheet after the pickling is then subjected to cold rolling to obtain a cold-rolled sheet. In this embodiment, the cold rolling is performed by multi-pass rolling having two or more passes, such as tandem multi-stand rolling or reverse rolling. Here, limiting the rolling reduction in the final pass to 1% or more and 5% or less and the rolling reduction in the pass immediately before the final pass to 5% or more and 30% or less is a very important constituent feature in this embodiment.

After the hot rolling, the cold rolling may be performed without heat treatment, or performed after heat treatment. In the case of performing the cold rolling after the heat treatment, the hot-rolled sheet is preferably held at a holding temperature of 450° C. or more and 800° C. or less for 900 s or more and 36000 s or less.

Rolling Reduction in Final Pass in Cold Rolling: 1% or More and 5% or Less

This is a very important constituent feature in this embodiment. By appropriately controlling the rolling reduction in the final pass to form the cold-rolled microstructure of the surface layer of the steel sheet and then annealing the cold-rolled sheet, the corresponding grain boundary frequency in the surface layer of the steel sheet can be controlled to achieve excellent LME resistance. If the rolling reduction in the final pass in the cold rolling is less than 1%, the cold-rolled microstructure of the surface layer of the steel sheet cannot be formed, and the corresponding grain boundary frequency in the surface layer of the steel sheet increases and the LME resistance decreases after the annealing. If the rolling reduction in the final pass in the cold rolling is more than 5%, the amount of processing strain in the surface layer of the steel sheet increases in the cold rolling, and the corresponding grain boundary frequency in the surface layer of the steel sheet increases and the LME resistance decreases after the annealing. Accordingly, the rolling reduction in the final pass in the cold rolling is 1% or more and 5% or less. The rolling reduction in the final pass in the cold rolling is preferably 2% or more, and more preferably 3% or more. The rolling reduction in the final pass in the cold rolling is preferably 4% or less.

Rolling Reduction in Pass Immediately Before Final Pass: 5% or More and 30% or Less This is a very important constituent feature in this embodiment. By appropriately controlling the rolling reduction in the pass immediately before the final pass, the area ratio of hard phase after the annealing can be appropriately controlled to achieve a TS of 980 MPa or more and excellent dimensional accuracy in forming, and further achieve excellent ductility. If the rolling reduction in the pass immediately before the final pass is less than 5%, the area ratio of hard phase decreases and the area ratio of ferrite increases, making it difficult to achieve a TS of 980 MPa or more. If the rolling reduction in the pass immediately before the final pass is more than 30%, the area ratio of ferrite after the annealing decreases, and the dimensional accuracy in forming and the ductility decrease. Accordingly, the rolling reduction in the pass immediately before the final pass is 5% or more and 30% or less. The rolling reduction in the pass immediately before the final pass is preferably 6% or more, and more preferably 7% or more. The rolling reduction in the pass immediately before the final pass is preferably 28% or less, and more preferably 25% or less.

The cumulative rolling reduction in the cold rolling is not limited, but is preferably 30% or more because the area ratio of hard phase can be controlled to the preferred range and the TS can be controlled to the more preferred range. Although no upper limit is placed on the cumulative rolling reduction in the cold rolling, the cumulative rolling reduction in the cold rolling is preferably 80% or less and more preferably 70% or less, in order to improve the dimensional accuracy in forming. Thus, the cumulative rolling reduction in the cold rolling is preferably 30% or more, more preferably 35% or more, and further preferably 40% or more. The cumulative rolling reduction in the cold rolling is preferably 80% or less, and more preferably 70% or less. The number of rolling passes in the cold rolling and the rolling reduction of each pass other than the final pass and the pass immediately before the final pass are not limited.

The cold-rolled sheet obtained in the above-described manner is then subjected to annealing. The annealing may be performed once or twice. Hereafter, the first annealing step in the case of performing annealing twice is referred to as "preliminary annealing step", and the second annealing step in the case of performing annealing twice and the first annealing step in the case of performing annealing once are simply referred to as "annealing step". As a result of performing annealing twice, fine retained austenite can be formed, and the ductility and the stretch flangeability can be improved. First, the preliminary annealing step in the case of performing annealing twice will be described below.

In the case of performing annealing twice, the heating temperature in the preliminary annealing, that is, the heating temperature after the cold rolling and before the below-described annealing step, is preferably 830° C. or more.

Heating Temperature in Preliminary Annealing: 830° C. or More

As a result of the heating temperature in the preliminary annealing being 830° C. or more, the area ratio of ferrite and the volume fraction of retained austenite in the microstructure after the second annealing can be controlled to the more preferred range to improve the ductility. Moreover, the area ratio of quenched martensite can be further reduced to further improve the dimensional accuracy in forming. Furthermore, the area ratio of quenched martensite can be further reduced to reduce the amount of diffusible hydrogen in the steel sheet, and the void formation amount after punching can be controlled to the more preferred range to further improve the stretch flangeability. The bendability can be further improved, too. Although no upper limit is placed on the heating temperature in the first annealing, the heating temperature in the first annealing is preferably 950° C. or less and more preferably 920° C. or less in order to improve the dimensional accuracy in forming. The heating temperature in the first annealing is more preferably 850° C. or more, and further preferably 870° C. or more.

The heat retention time in the heating process of the preliminary annealing is not limited, but is preferably 10 s or more and 1000 s or less.

The cold-rolled sheet heated to the heating temperature of 830° C. or more is then preferably cooled under the condition that the average cooling rate from the heating temperature to 500° C. is 5° C./s or more.

Average Cooling Rate from Heating Temperature of 830° C. or More to 500° C.: 5° C./s or More As a result of the average cooling rate from the heating temperature of 830° C. or more to 500° C. being 5° C./s or more, the amount of ferrite formed during cooling in the preliminary annealing can be reduced to control the area ratio of ferrite in the microstructure after the annealing step to the more preferred range and also control the volume fraction of retained austenite to the more preferred range, so that the ductility can be controlled to the more preferred range. Moreover, the area ratio of quenched martensite can be controlled to the more preferred range, so that the dimensional accuracy in forming can be controlled to the more preferred range. Furthermore, since the area ratio of quenched martensite can be controlled to the more preferred range, the amount of diffusible hydrogen in the steel sheet can be controlled to the more preferred range, so that the void formation amount after punching can be reduced and the stretch flangeability can be further improved. The bendability can be controlled to the more preferred range, too. Although no upper limit is placed on the average cooling rate from the heating temperature of 830° C. or more to 500° C., the average cooling rate from the heating temperature of 830° C. or more to 500° C. is preferably 1000° C./s or less in terms of constraints on production technology. The average cooling rate from the heating temperature of 830° C. or more to 500° C. is more preferably 8° C./s or more. The method of cooling from the heating temperature of 830° C. or more is not limited, and cooling methods such as gas jet cooling, mist cooling, water cooling, and air cooling may be used.

The average cooling rate from below 500° C., the cooling stop temperature, and the cooling method after cooling to 500° C. are not limited. The cooling method may be gas jet cooling, mist cooling, water cooling, air cooling, or the like. In an example, the cold-rolled sheet may be cooled from below 500° C. to a cooling stop temperature from 450° C. to about room temperature. The average cooling rate from below 500° C. to the cooling stop temperature is, for example, 5° C./s or more and 1000° C./s or less. In the case where the cooling stop temperature is in a range of about 450° C. to about 150° C., heat retention may be performed at the cooling stop temperature for 10 s or more and 1000 s or less before cooling to a temperature from 50° C. to about room temperature. In the case where the cooling stop temperature is in a range of about 250° C. to about room temperature, after the cooling stop, heat retention may be performed at a temperature higher than the cooling stop temperature for 10 s or more and 1000 s or less before cooling to a temperature from 50° C. to about room temperature.

Preferably, after the preliminary annealing step, the cold-rolled sheet is cooled to 50° C. or less and then rolled at an elongation rate of 0.05% or more and 1.00% or less.

Elongation Rate in Rolling after Cooling to 50° C. or Less after Preliminary Annealing: 0.05% or More and 1.00% or Less As a result of rolling being performed after cooling to 50° C. or less after the preliminary annealing, the corresponding grain boundary frequency in the surface layer of the steel sheet after the annealing can be reduced, and the LME resistance can be improved. To achieve this effect, the elongation rate in the rolling after cooling to 50° C. or less after the preliminary annealing is preferably 0.05% or more. If the elongation rate in the rolling after cooling to 50° C. or less after the preliminary annealing is more than 1.00%, the grain sizes of ferrite and hard phase after the annealing decrease, so that the YR increases and the dimensional accuracy in forming decreases. Accordingly, the elongation rate in the rolling after cooling to 50° C. or less after the preliminary annealing is preferably 1.00% or less, and more preferably 0.70% or less. The elongation rate in the rolling after cooling to 50° C. or less after the preliminary annealing is more preferably 0.10% or more.

The rolling after cooling to 50° C. or less may be performed by a device continuous with an annealing device for performing the preliminary annealing step (i.e. online), or performed by a device not continuous with the annealing device for performing the preliminary annealing step (i.e. offline). The rolling may be performed once to achieve the target elongation rate, or performed a plurality of times to achieve the elongation rate of 0.05% or more and 1.00% or less in total. The rolling mentioned herein typically denotes temper rolling, but may be rolling by a method such as working by a leveler as long as the same elongation rate as in temper rolling can be achieved.

The second annealing conditions in the case of performing annealing twice or the annealing conditions in the case of performing annealing only once will be described below. In the annealing step, the cold-rolled sheet is heated to a heating temperature of 740° C. or more and 880° C. or less in an atmosphere with a dew point of −35° C. or more, and cooled to a cooling stop temperature of 150° C. or more and 300° C. or less under the condition that the average cooling rate from the heating temperature to 500° C. is 10° C./s or more.

First, the cold-rolled sheet after the cold rolling or after the preliminary annealing is heated to 740° C. or more and 880° C. or less in the atmosphere with a dew point of −35° C. or more.

Heating Temperature in Annealing Step: 740° C. or More and 880° C. or Less

If the heating temperature in the annealing step is less than 740° C., the proportion of austenite formed during heating in the ferrite-austenite dual phase region is insufficient. Hence, the area ratio of hard phase and the volume fraction of retained austenite after the annealing decrease, the area ratio of ferrite increases, and the TS and the ductility decrease. If the heating temperature is more than 900° C., the heating is performed in the austenite single phase region, and thus the area ratio of ferrite after the annealing decreases and the area ratio of hard phase increases, so that the dimensional accuracy in forming and the ductility decrease. Accordingly, the heating temperature is 740° C. or more and 880° C. or less. The heating temperature is preferably 760° C. or more, more preferably 770° C. or more, and further preferably 780° C. or more. The heating temperature is preferably 860° C. or less, and more preferably 850° C. or less.

The holding time at the heating temperature is not limited, but is preferably 10 s or more and 600 s or less.

Dew Point of Atmosphere at Heating Temperature: −35° C. or More

As a result of the dew point of the atmosphere at the heating temperature being −35° C. or more, decarburization progresses through water in the air, and a softening layer can be formed in the surface layer of the steel sheet. Consequently, excellent bendability and LME resistance can be achieved. Although no upper limit is placed on the dew point in the heating temperature range, the dew point at the heating temperature is preferably 15° C. or less and more preferably 5° C. or less in order to limit the TS to the preferred range. The dew point at the heating temperature is preferably −30° C. or more, and more preferably −25° C. or more. The temperature of the heating temperature range is based on the surface temperature of the steel sheet. That is, in the case where the surface temperature of the steel sheet is the foregoing heating temperature, the dew point of the atmosphere is adjusted to the foregoing range.

The cold-rolled sheet is then cooled to a cooling stop temperature of 150° C. or more and 300° C. or less under the condition that the average cooling rate to 500° C. is 10° C./s or more.

Average Cooling Rate from Heating Temperature to 500° C.: 10° C./s or More

As a result of the average cooling rate from the heating temperature of 740° C. or more and 880° C. or less to 500° C. being 10° C./s or more, the area ratio of hard phase and the area ratio of ferrite can each be controlled to the desired range, and a TS of 980 MPa or more and excellent dimensional accuracy in forming can be achieved. No upper limit is placed on the average cooling rate from the heating temperature to 500° C. However, if the average cooling rate from the heating temperature to 500° C. is more than 50° C./s, the area ratio of ferrite after the annealing decreases. Hence, the average cooling rate from the heating temperature to 500° C. is preferably 50° C./s or less and more preferably 35° C./s or less, from the viewpoint of improving the dimensional accuracy in forming and the ductility. The average cooling rate from the heating temperature to 500° C. is preferably 12° C./s or more, more preferably 15° C./s or more, and further preferably 20° C./s or more.

Cooling Stop Temperature in Annealing Step: 150° C. or More and 300° C. or Less

As a result of the cooling stop temperature being not more than the martensite transformation start temperature, the area ratio of bainitic ferrite formed in the below-described heat retention step after reheating increases, and the volume fraction of retained austenite can be controlled to the desired range. Moreover, as a result of part of austenite undergoing martensite transformation at the time of cooling stop, the amount of diffusible hydrogen in the steel sheet can be reduced, and consequently the void formation amount after punching can be reduced and the stretch flangeability can be improved. Excellent bendability can be achieved, too. If the cooling stop temperature is less than 150° C., almost all of non-transformed austenite that exists during the cooling transforms into martensite at the time of cooling stop, so that the area ratio of bainitic ferrite decreases and the volume fraction of retained austenite cannot be controlled to the desired range. Consequently, the ductility decreases. Moreover, since the area ratio of tempered martensite increases, the YR increases, and the dimensional accuracy in forming decreases. In addition, the carbon concentration in retained austenite cannot be controlled to the desired range, making it difficult to ensure the ductility and the dimensional accuracy in forming. If the cooling stop temperature is more than 300° C., the area ratio of bainitic ferrite decreases, the volume fraction of retained austenite cannot be controlled to the desired range, and the ductility decreases. Moreover, since the area ratio of quenched martensite increases, the YR decreases, and the dimensional accuracy in forming decreases. In addition, the carbon concentration in retained austenite cannot be controlled to the desired range, making it difficult to ensure the ductility and the dimensional accuracy in forming. Further, the amount of diffusible hydrogen in the steel sheet increases with an increase in the area ratio of quenched martensite, and thus the void formation amount after punching increases and the stretch flangeability decreases. The bendability decreases, too. Accordingly, the cooling stop temperature is 150° C. or more and 300° C. or less. The cooling stop temperature is preferably 170° C. or more, and more preferably 180° C. or more. The cooling stop temperature is preferably 270° C. or less, and more preferably 240° C. or less.

The average cooling rate from below 500° C. to the cooling stop temperature in the cooling is not limited, but is typically 1° C./s or more and 50° C./s or less.

The cold-rolled sheet after the annealing step is then reheated to a reheating temperature of (cooling stop temperature+50° C.) or more and 500° C. or less, and held at the reheating temperature for 10 s or more.

Reheating Temperature: (Cooling Stop Temperature+50° C.) or More and 500° C. or Less As a result of the cold-rolled sheet being reheated to a temperature higher than the cooling stop temperature after the annealing step, martensite that exists at the time of cooling stop is tempered, and C dissolved in martensite oversaturatedly is diffused into austenite, so that austenite stable at room temperature, i.e. retained austenite, can be formed. If the reheating temperature is less than (cooling stop temperature+50° C.), the temperature is lower than the nose position of bainite transformation, so that the area ratio of bainitic ferrite decreases and the volume fraction of retained austenite cannot be controlled to the desired range. Consequently, the ductility decreases. In addition, the carbon concentration in retained austenite cannot be controlled to the desired range, making it difficult to ensure the ductility and the dimensional accuracy in forming. Moreover, it is difficult to reduce the amount of diffusible hydrogen in the steel sheet, and thus the stretch flangeability and the bendability decrease. Further, since the area ratio of quenched martensite increases, the YR decreases, and the dimensional accuracy in forming decreases. Besides, with an increase in the area ratio of quenched martensite, the void formation amount after punching increases, and the stretch flangeability decreases. The bendability decreases, too. If the reheating temperature is more than 500° C., the temperature is higher than the nose position of bainite transformation, so that the area ratio of bainitic ferrite decreases and the volume fraction of retained austenite cannot be controlled to the desired range. Consequently, the ductility decreases. In addition, the carbon concentration in retained austenite cannot be controlled to the desired range, making it difficult to ensure the ductility and the dimensional accuracy in forming. Further, since the area ratio of quenched martensite increases, the YR decreases, and the dimensional accuracy in forming decreases. Besides, with an increase in the area ratio of quenched martensite, the void formation amount after punching increases, and the stretch flangeability decreases. The bendability decreases, too. Accordingly, the reheating temperature is (cooling stop temperature+50° C.) or more and 500° C. or less. The reheating temperature is preferably (cooling stop temperature+80° C.) or more, and more preferably (cooling stop temperature+100° C.) or more. The reheating temperature (in the second annealing) is preferably 450° C. or less.

Heat Retention Time at Reheating Temperature: 10 s or More

As a result of performing heat retention at the reheating temperature, the area ratio of bainitic ferrite can be increased to control the volume fraction of retained austenite to the desired range. If the heat retention time at the reheating temperature is less than 10 s, the area ratio of bainitic ferrite decreases, and the volume fraction of retained austenite cannot be controlled to the desired range. Consequently, the ductility decreases. In addition, the carbon concentration in retained austenite cannot be controlled to the desired range, making it difficult to ensure the ductility and the dimensional accuracy in forming. Moreover, it is difficult to reduce the amount of diffusible hydrogen in the steel sheet, and thus the stretch flangeability and the bendability decrease. Further, since the area ratio of quenched martensite increases, the YR decreases, and the dimensional accuracy in forming decreases. Besides, with an increase in the area ratio of quenched martensite, the void formation amount after punching increases, and the stretch flangeability decreases. The bendability decreases, too. Accordingly, the heat retention time at the reheating temperature is 10 s or more. Although no upper limit is placed on the heat retention time at the reheating temperature, the heat retention time at the reheating temperature is preferably 1000 s or less in terms of constraints on production technology. The heat retention time at the reheating temperature is preferably 13 s or more, and more preferably 16 s or more. The heat retention time at the reheating temperature is preferably 1000 s or less, and more preferably 200 s or less.

The average cooling rate, the cooling stop temperature, and the cooling method after the heat retention at the reheating temperature are not limited. The cooling method may be gas jet cooling, mist cooling, water cooling, air cooling, or the like. After the heat retention at the reheating temperature, the cold-rolled sheet is preferably cooled to 50° C. or less and more preferably cooled to about room temperature, from the viewpoint of preventing oxidation of the steel sheet surface. The average cooling rate in the cooling is typically 1° C./s or more and 50° C./s or less. In the case where the high-strength steel sheet is to be traded, the high-strength steel sheet is typically subjected to trading after cooled to room temperature.

The high-strength steel sheet may be subjected to temper rolling. If the rolling reduction in the temper rolling is more than 1.50%, the yield stress of the steel increases, and the dimensional accuracy in forming decreases. The rolling reduction in the temper rolling is therefore preferably 1.50% or less. Although no lower limit is placed on the rolling reduction in the temper rolling, the rolling reduction in the temper rolling is preferably 0.05% or more from the viewpoint of productivity. The temper rolling may be performed by a device continuous with the annealing device for performing the foregoing annealing step (i.e. online), or performed by a device not continuous with the annealing device for performing the annealing step (i.e. offline). The rolling may be performed once to achieve the target rolling reduction, or performed a plurality of times to achieve the rolling reduction of 0.05% or more and 1.00% or less in total. The rolling mentioned herein typically denotes temper rolling, but may be rolling by a leveler or the like as long as the same elongation rate as in temper rolling can be achieved.

An effective way of producing a high-strength steel sheet in which the minor axis length of austenite is 2.0 µm or less is to more appropriately adjust the cooling stop temperature in the annealing step and the reheating temperature. Specifically, by controlling the cooling stop temperature in the annealing step to 160° C. or more and 250° C. or less and the reheating temperature to 300° C. or more and 450° C. or less, the minor axis length of austenite can be limited to 2.0 µm or less.

After the annealing step, the high-strength steel sheet may be subjected to coating or plating treatment. The type of coating or plating metal is not limited, and is, for example, zinc. Examples of zinc coating or plating treatment include hot-dip galvanizing treatment and galvannealing treatment that involves alloying treatment after hot-dip galvanizing treatment. The annealing and the hot-dip galvanizing treatment may be performed using a device configured to continuously perform annealing and hot-dip galvanizing treatment (i.e. in one line). Alternatively, hot-dip zinc-aluminum-magnesium alloy coating treatment may be performed.

When performing hot-dip galvanizing treatment, the high-strength steel sheet is immersed in a galvanizing bath of 440° C. or more and 500° C. or less to perform hot-dip galvanizing treatment, and then the coating weight is adjusted by gas wiping or the like. For the hot-dip galvanizing, a galvanizing bath having a composition containing Al: 0.10 mass % or more and 0.23 mass % or less with the balance consisting of Fe and inevitable impurities is preferably used. When performing alloying treatment on the zinc coating, the zinc coating is subjected to the alloying treatment in a temperature range of 460° C. or more and 600° C. or less after the hot-dip galvanizing. If the alloying temperature is less than 460° C., the Zn—Fe alloying rate is excessively low. In such a case, alloying is very difficult. If the alloying temperature is more than 600° C., non-transformed austenite may transform into pearlite, causing the TS and the ductility to decrease. Accordingly, when performing alloying treatment on the zinc coating, the alloying treatment is preferably performed in a temperature range of 460° C. or more and 600° C. or less, more preferably performed in a temperature range of 470° C. or more and 560° C. or less, and further preferably performed in a temperature range of 470° C. or more and 530° C. or less.

The coating weight of the hot-dip galvanized steel sheet (GI) and the galvannealed steel sheet (GA) is preferably 20 g/m$^2$ to 80 g/m$^2$ per one side (both-sided coating). The coating weight can be adjusted by gas wiping or the like after the galvanizing.

Although hot-dip galvanizing has been mainly described above, electroplating may be performed to form a coating or plating layer such as a Zn plating, a Zn—Ni alloy electroplating, or an Al plating. For example, the coating or plating layer is an electrogalvanizing layer. In the case of forming the electrogalvanizing layer, for example, a plating solution containing Ni: 9 mass % or more and 25 mass % or less with the balance consisting of Zn and inevitable impurities may be used. Moreover, a plating bath of room temperature or more and 100° C. or less is preferably used. The coating weight of the electrogalvanized steel sheet (EG) is preferably 15 g/m$^2$ to 100 g/m$^2$ per one side (both-sided coating).

After the high-strength steel sheet subjected to the coating or plating treatment is cooled to 50° C. or less, the high-strength steel sheet may be rolled at an elongation rate of 0.05% or more and 1.00% or less, as mentioned above. As a result of the elongation rate in the rolling performed after cooling to 50° C. or less being 0.05% or more, cracks can be introduced into the coating or plating layer. Introducing cracks into the coating or plating layer can reduce the amount of diffusible hydrogen in the steel sheet, so that the stretch flangeability can be further improved. If the elongation rate in the rolling after cooling to 50° C. or less is more than 1.00%, the YS increases, and the dimensional accuracy in forming decreases. The elongation rate in the rolling after cooling to 50° C. or less is therefore preferably 1.00% or less, and more preferably 0.70% or less. The elongation rate in the rolling after cooling to 50° C. or less is more preferably 0.10% or more.

The rolling after cooling to 50° C. or less may be performed by a device continuous with a coating or plating device for performing the coating or plating treatment (i.e. online), or performed by a device not continuous with the coating or plating device for performing the coating or plating treatment (i.e. offline). The rolling may be performed once to achieve the target elongation rate, or performed a plurality of times to achieve the elongation rate of 0.05% or more and 1.00% or less in total. The rolling mentioned herein typically denotes temper rolling, but may be rolling by a method such as working by a leveler as long as the same elongation rate as in temper rolling can be achieved.

After rolling the high-strength steel sheet after cooling to 50° C. or less, heat retention may be performed in a temperature range of room temperature or more and 300° C. or less. As a result of performing heat retention in a temperature range of room temperature or more and 300° C. or less, the amount of diffusible hydrogen in the steel sheet can be further reduced. Consequently, the void formation amount after punching decreases, and the stretch flangeability and the bendability can be improved. The heat retention time is typically about 3 days to 7 days, but may be about six months at the maximum.

The production conditions other than the above-described conditions may be in accordance with conventional methods.

Embodiment 2

A method for producing a high-strength steel sheet according to another one of the disclosed embodiments will be described below. A high-strength steel sheet according to the present disclosure can also be produced by coiling the hot-rolled sheet after the hot rolling at a coiling temperature of 350° C. or more and 600° C. or less, thereafter retaining the hot-rolled sheet in a temperature range of 300° C. or more for 5000 s or more, and thereafter cooling the hot-rolled sheet, instead of limiting the rolling reduction in the cold rolling to 1% or more and 5% or less and the rolling reduction in the pass immediately before the final pass to 5% or more and 30% or less.

In detail, the method for producing a high-strength steel sheet according to this embodiment comprises: subjecting a steel slab having the foregoing chemical composition to hot rolling to obtain a hot-rolled sheet; thereafter coiling the hot-rolled sheet at a coiling temperature of 350° C. or more and 600° C. or less; thereafter retaining the hot-rolled sheet in a temperature range of 300° C. or more for 5000 s or more, and then cooling the hot-rolled sheet; thereafter subjecting the hot-rolled sheet to pickling; thereafter subjecting the hot-rolled sheet to cold rolling under the condition that the cumulative rolling reduction in the cold rolling is 30% or more and 75% or less, to obtain a cold-rolled sheet; thereafter subjecting the cold-rolled sheet to annealing that involves heating to a heating temperature of 740° C. or more and 880° C. or less in an atmosphere with a dew point of −35° C. or more and then cooling to a cooling stop temperature of 150° C. or more and 300° C. or less under the condition that the average cooling rate from the heating temperature to 500° C. is 10° C./s or more; and thereafter reheating the cold-rolled sheet to a reheating temperature of (cooling stop temperature+50° C.) or more and 500° C. or less, and holding the cold-rolled sheet at the reheating temperature for 10 s or more.

The details of the hot rolling performed on the steel slab having the foregoing chemical composition to obtain the hot-rolled sheet are the same as those in Embodiment 1.

Coiling Temperature after Hot Rolling: 350° C. or More and 600° C. or Less

After the finish rolling, the hot-rolled sheet is coiled and collected. As a result of the coiling temperature being 350° C. or more, C diffuses into oxide scale which forms during the hot rolling, that is, the decarburization of the surface layer of the steel sheet is facilitated. Hence, the surface layer softening thickness of the annealed sheet and the corresponding grain boundary frequency in the surface layer of the steel sheet can each be controlled to the desired range. Consequently, excellent bendability and LME resistance can be achieved. If the coiling temperature after the hot rolling is more than 600° C., the surface layer softening thickness of the annealed sheet increases, making it difficult to achieve a TS of 980 MPa or more. The coiling temperature after the hot rolling is therefore 350° C. or more and 600° C. or less. From the viewpoint of controlling the ratio of the C strength of the surface layer of the steel sheet to the C strength at a position of ¼ of the thickness of the steel sheet to 0.7 or less, the coiling temperature after the hot rolling is preferably 380° C. or more, and more preferably 410° C. or more. The coiling temperature after the hot rolling is preferably 570° C. or less, and more preferably 550° C. or less.

Retention Time in Temperature Range of 300° C. or More after Coiling: 5000 s or More This is a very important constituent feature in this embodiment. After coiling the hot-rolled sheet to obtain a hot-rolled coil, the hot-rolled coil is retained in a temperature range of 300° C. or more for a retention time of 5000 s or more. The retention time is measured from the time at which the hot-rolled sheet is formed into the hot-rolled coil. Thus, C diffuses into oxide scale which forms during the hot rolling, that is, the decarburization of the surface layer of the steel sheet is facilitated. Hence, the surface layer softening thickness of the annealed sheet and the corresponding grain boundary frequency in the surface layer of the steel sheet can each be controlled to the desired range. Consequently, excellent bendability and LME resistance can be achieved. After coiling the hot-rolled sheet, the hot-rolled coil may be subjected to heat retention or cooling from the coiling temperature so that the retention time in the temperature range of 300° C. or more will be 5000 s or more, or the hot-rolled coil may be cooled from the coiling temperature to below 300° C. and then reheated to 300° C. or more and retained in the temperature range of 300° C. or more for 5000 s or more. Although no upper limit is placed on the retention time in the temperature range of 300° C. or more after the coiling, the retention time in the temperature range of 300° C. or more after the coiling is preferably 100000 s or less in order to limit the TS to the preferred range. Thus, the retention time in the temperature range of 300° C. or more after the coiling is 5000 s or more. From the viewpoint of controlling the ratio of the C strength of the surface layer of the steel sheet to the C strength at a position of ¼ of the thickness of the steel sheet to 0.7 or less, the retention time in the temperature range of 300° C. or more after the coiling is preferably 7000 s or more, and more preferably 9000 s or more. The retention time in the temperature range of 300° C. or more after the coiling is preferably 80000 s or less, and more preferably 40000 s or less. The temperature at which the hot-rolled coil is retained is not limited as long as it is within the temperature range of 300° C. or more, but is preferably 600° C. or less. The temperature at which the hot-rolled coil is retained is preferably 350° C. or more.

After retaining the hot-rolled sheet in the temperature range of 300° C. or more for 5000 s or more, the hot-rolled sheet is cooled. The cooling rate is not limited, and is, for example, 0.001° C./s or more and 1° C./s or less. The cooling stop temperature is not limited, and is, for example, 20° C. or more and 200° C. or less.

The hot-rolled sheet is then subjected to pickling. The pickling enables removal of oxides from the steel sheet surface, and is thus important to ensure favorable chemical convertibility and coating quality in the high-strength steel sheet as the finished product. The pickling may be performed only once, or a plurality of times.

The hot-rolled sheet may be subjected to heat treatment before or after the pickling. As a result of the hot-rolled sheet being subjected to heat treatment before or after the pickling, the decarburization of the surface layer of the steel sheet is facilitated, and the surface layer softening thickness of the annealed sheet can be controlled to the more preferred range. Moreover, the ratio of the C strength of the surface layer of the steel sheet to the C strength at a position of ¼ of the thickness of the steel sheet can be controlled to the desired range. The heat treatment before or after the pickling is preferably performed by holding the hot-rolled sheet in a temperature range of 450° C. or more and 650° C. or less for 900 s or more. Although no upper limit is placed on the holding time in the heat treatment, the holding time is preferably 36000 s or less.

The hot-rolled sheet after the pickling or the hot-rolled sheet (heat-treated sheet) obtained by performing the heat treatment after the pickling is then subjected to cold rolling to obtain a cold-rolled sheet. In this embodiment, the cold rolling is performed by multi-pass rolling having two or more passes, such as tandem multi-stand rolling or reverse rolling.

Cumulative Rolling Reduction in Cold Rolling: 30% or More and 75% or Less

As a result of the cumulative rolling reduction in the cold rolling being 30% or more, the area ratio of ferrite can be limited to 25% or less. Consequently, the YR can be controlled to the desired range, and excellent dimensional accuracy in forming can be achieved. If the cumulative rolling reduction in the cold rolling is more than 75%, the amount of processing strain in the surface layer of the steel sheet increases in the cold rolling, and the corresponding grain boundary frequency in the surface layer of the steel sheet increases and the LME resistance decreases after the annealing. The cumulative rolling reduction in the cold rolling is therefore 30% or more and 75% or less. The cumulative rolling reduction in the cold rolling is preferably 40% or more, and more preferably 45% or more. The cumulative rolling reduction in the cold rolling is preferably 70% or less, and more preferably 65% or less.

In this embodiment, the rolling reduction in the final pass in the cold rolling and the rolling reduction in the pass immediately before the final pass are not limited, unlike in Embodiment 1 described above. However, it is preferable to limit the rolling reduction in the final pass to 1% or more and 5% or less and the rolling reduction in the pass immediately before the final pass to 5% or more and 30% or less, as in Embodiment 1.

Rolling Reduction in Final Pass in Cold Rolling: 1% or More and 5% or Less

By appropriately controlling the rolling reduction in the final pass to form the cold-rolled microstructure of the surface layer of the steel sheet and then annealing the cold-rolled sheet, the corresponding grain boundary frequency in the surface layer of the steel sheet can be controlled to the more preferred range, and better LME resistance can be achieved. As a result of the rolling reduction in the final pass in the cold rolling being 1% or more, the cold-rolled microstructure of the surface layer of the steel sheet can be suitably formed, the corresponding grain boundary frequency in the surface layer of the steel sheet after annealing can be controlled to the more preferred range, and better LME resistance can be achieved. As a result of the rolling reduction in the final pass in the cold rolling being 5% or less, the amount of processing strain in the surface layer of the steel sheet during the cold rolling can be controlled to the preferred range, the corresponding grain boundary frequency in the surface layer of the steel sheet after the annealing can be controlled to the more preferred range, and better LME resistance can be achieved. Accordingly, the rolling reduction in the final pass in the cold rolling is preferably 1% or more and 5% or less. The rolling reduction in the final pass in the cold rolling is more preferably 2% or more, and further preferably 3% or more. The rolling reduction in the final pass in the cold rolling is more preferably 4% or less.

Rolling Reduction in Pass Immediately Before Final Pass: 5% or More and 30% or Less By appropriately controlling the rolling reduction in the pass immediately before the final pass, the area ratio of hard phase after the annealing can be controlled to the more preferred range, the TS can be controlled to the more preferred range. Moreover, better dimensional accuracy informing can be achieved, and better ductility can be achieved. As a result of the rolling reduction in the pass immediately before the final pass being 5% or more, the area ratio of hard phase and the area ratio of ferrite can be controlled to the more preferred range, and the TS can be controlled to the more preferred range. As a result of the rolling reduction in the pass immediately before the final pass being 30% or less, the area ratio of ferrite after the annealing can be controlled to the more preferred range, and better dimensional accuracy and ductility can be achieved in forming. Accordingly, the rolling reduction in the pass immediately before the final pass is preferably 5% or more and 30% or less. The rolling reduction in the pass immediately before the final pass is more preferably 6% or more, and further preferably 7% or more. The rolling reduction in the pass immediately before the final pass is more preferably 28% or less, and further preferably 25% or less.

The number of rolling passes in the cold rolling and the rolling reduction of each pass other than the final pass and the pass immediately before the final pass are not limited.

The cold-rolled sheet obtained in the above-described manner is then subjected to annealing. The cold-rolled sheet after the annealing is then reheated and held at the reheating temperature for 10 s or more, to obtain a high-strength steel sheet according to this embodiment. The details of the annealing step and the reheating after the annealing are the same as those in Embodiment 1, and accordingly their description is omitted.

EXAMPLES

Each steel material having the chemical composition shown in Table 1 with the balance consisting of Fe and inevitable impurities was subjected to steelmaking in a converter, and continuously cast to obtain a steel slab. The obtained steel slab was heated to 1250° C., and subjected to rough rolling. The rough-rolled sheet was then subjected to finish rolling at a finish rolling temperature of 900° C., and coiled at a coiling temperature of 450° C. to obtain a hot-rolled sheet. The hot-rolled sheet was pickled, and then subjected to cold rolling. The rolling reduction in each of the final pass and the pass immediately before the final pass in the cold rolling is shown in Tables 2-1 and 2-2. The thickness of the cold-rolled sheet after the cold rolling was 1.2 mm.

The cold-rolled sheet was then subjected to annealing under the conditions shown in Tables 2-1 and 2-2, to obtain a cold-rolled steel sheet (CR). In the preliminary annealing step, the holding time at the heating temperature was 140 s to 210 s. In the annealing step, the holding time at the heating temperature was 50 s to 120 s. In the preliminary annealing step, the average cooling rate from below 500° C. was 3° C./s to 100° C./s. In the annealing step, the average cooling rate from below 500° C. to the cooling stop temperature was 5° C./s to 25° C./s. Some cold-rolled sheets were each further subjected to coating or plating treatment to obtain a hot-dip galvanized steel sheet (GI), a galvannealed steel sheet (GA), or an electrogalvanized steel sheet (EG). In the case of producing GI, the hot-dip galvanizing bath used was a zinc bath containing Al: 0.20 mass % with the balance consisting of Zn and inevitable impurities. In the case of producing GA, the hot-dip galvanizing bath used was a zinc bath containing Al: 0.14 mass % with the balance consisting of Zn and inevitable impurities. The bath temperature was 470° C. both in the case of producing GI and in the case of producing GA. In the case of producing EG, a plating solution containing Ni: 9 mass % or more and 25 mass % or less with the balance consisting of Zn and inevitable impurities was used. In the case of producing GI, the coating weight was about 45 $g/m^2$ to 72 $g/m^2$ per one side (both-sided coating). In the case of producing GA, the coating weight was about 45 $g/m^2$ per one side (both-sided coating). In the case of producing EG, the coating weight was about 60 $g/m^2$ per one side (both-sided coating). The alloying treatment in the case of producing GA was performed at about 550° C. The composition of the coating or plating layer of GI contained Fe: 0.1 mass % to 1.0 mass % and Al: 0.2 mass % to 1.0 mass %, with the balance consisting of Fe and inevitable impurities. The composition of the coating or plating layer of GA contained Fe: 7 mass % to 15 mass % and Al: 0.1 mass % to 1.0 mass %, with the balance consisting of Fe and inevitable impurities.

TABLE 1

| Steel sample ID | Chemical composition (mass %) | | | | | | | | | | | | |
|---|---|---|---|---|---|---|---|---|---|---|---|---|---|
| | C | Si | Mn | P | S | Al | N | Mo | Cr | Ca | Sb | Ti | Nb |
| A | 0.166 | 1.65 | 2.25 | 0.030 | 0.0007 | 0.043 | 0.0027 | 0.035 | 0.000 | 0.0018 | 0.017 | — | — |
| B | 0.196 | 1.56 | 2.05 | 0.017 | 0.0036 | 0.045 | 0.0009 | 0.047 | 0.076 | 0.0000 | 0.006 | — | — |
| C | 0.195 | 1.32 | 2.23 | 0.016 | 0.0031 | 0.061 | 0.0019 | 0.092 | 0.049 | 0.0002 | 0.000 | — | — |
| D | 0.157 | 1.39 | 2.29 | 0.009 | 0.0017 | 0.062 | 0.0031 | 0.000 | 0.050 | 0.0001 | 0.016 | — | — |
| E | 0.205 | 1.39 | 2.24 | 0.014 | 0.0012 | 0.051 | 0.0011 | 0.044 | 0.028 | 0.0002 | 0.018 | — | — |
| F | 0.187 | 1.37 | 1.88 | 0.005 | 0.0033 | 0.051 | 0.0034 | 0.237 | 0.245 | 0.0003 | 0.013 | — | — |
| G | 0.224 | 1.36 | 1.96 | 0.020 | 0.0007 | 0.041 | 0.0011 | 0.089 | 0.054 | 0.0002 | 0.011 | — | — |
| H | 0.098 | 1.61 | 2.19 | 0.023 | 0.0023 | 0.027 | 0.0018 | 0.083 | 0.033 | 0.0002 | 0.013 | — | — |
| I | 0.185 | 2.15 | 2.14 | 0.023 | 0.0022 | 0.050 | 0.0044 | 0.087 | 0.044 | 0.0002 | 0.018 | — | — |
| J | 0.204 | 1.67 | 1.38 | 0.009 | 0.0018 | 0.063 | 0.0033 | 0.037 | 0.040 | 0.0002 | 0.009 | — | — |
| K | 0.196 | 1.35 | 1.84 | 0.024 | 0.0015 | 0.053 | 0.0047 | 0.016 | 0.012 | 0.0001 | 0.010 | — | — |
| L | 0.187 | 1.39 | 2.31 | 0.028 | 0.0011 | 0.054 | 0.0025 | 0.269 | 0.229 | 0.0001 | 0.009 | — | — |
| M | 0.208 | 1.33 | 2.05 | 0.004 | 0.0015 | 0.034 | 0.0027 | 0.097 | 0.089 | 0.0002 | 0.005 | 0.044 | — |
| N | 0.194 | 1.73 | 2.09 | 0.007 | 0.0032 | 0.066 | 0.0012 | 0.075 | 0.043 | 0.0001 | 0.003 | — | 0.023 |
| O | 0.190 | 1.41 | 2.21 | 0.004 | 0.0014 | 0.065 | 0.0023 | 0.066 | 0.043 | 0.0001 | 0.004 | — | — |
| P | 0.206 | 1.31 | 2.25 | 0.016 | 0.0031 | 0.054 | 0.0045 | 0.069 | 0.031 | 0.0003 | 0.004 | 0.019 | — |
| Q | 0.151 | 1.47 | 2.06 | 0.024 | 0.0004 | 0.047 | 0.0033 | 0.075 | 0.049 | 0.0003 | 0.006 | — | — |
| R | 0.168 | 1.47 | 2.21 | 0.012 | 0.0033 | 0.038 | 0.0015 | 0.056 | 0.086 | 0.0002 | 0.009 | — | — |
| S | 0.162 | 1.56 | 2.09 | 0.007 | 0.0034 | 0.044 | 0.0049 | 0.095 | 0.064 | 0.0002 | 0.019 | — | — |
| T | 0.158 | 1.67 | 2.19 | 0.008 | 0.0031 | 0.065 | 0.0046 | 0.092 | 0.077 | 0.0003 | 0.019 | — | — |
| U | 0.185 | 1.62 | 2.27 | 0.007 | 0.0035 | 0.047 | 0.0050 | 0.054 | 0.075 | 0.0001 | 0.003 | — | 0.019 |
| V | 0.161 | 1.49 | 2.07 | 0.009 | 0.0039 | 0.034 | 0.0034 | 0.032 | 0.066 | 0.0001 | 0.013 | — | — |
| W | 0.166 | 1.33 | 2.17 | 0.010 | 0.0038 | 0.031 | 0.0039 | 0.078 | 0.100 | 0.0003 | 0.0005 | — | — |
| X | 0.181 | 1.69 | 2.29 | 0.019 | 0.0026 | 0.035 | 0.0025 | 0.100 | 0.097 | 0.0001 | 0.018 | — | — |
| Y | 0.200 | 1.20 | 2.22 | 0.008 | 0.0012 | 0.032 | 0.0015 | 0.072 | 0.056 | 0.0002 | 0.013 | — | — |
| Z | 0.209 | 0.91 | 2.35 | 0.023 | 0.0032 | 0.056 | 0.0009 | 0.000 | 0.054 | 0.0003 | 0.046 | — | — |
| a | 0.196 | 1.49 | 2.26 | 0.023 | 0.0025 | 0.035 | 0.0040 | 0.011 | 0.076 | 0.0001 | 0.241 | — | — |
| b | 0.190 | 1.40 | 2.18 | 0.011 | 0.0014 | 0.052 | 0.0042 | 0.008 | 0.084 | 0.0218 | 0.015 | — | — |

| Steel sample ID | Chemical composition (mass %) | | | | | | | | | | | |
|---|---|---|---|---|---|---|---|---|---|---|---|---|
| | V | B | Cu | Ni | Sn | Ta | Mg | Zn | Co | Zr | REM | $Mn_{eq}$ | Remarks |
| A | — | — | — | — | — | — | — | — | — | — | — | 2.88 | Disclosed steel |
| B | — | — | — | — | — | — | — | — | — | — | — | 2.74 | Disclosed steel |
| C | — | — | — | — | — | — | — | — | — | — | — | 2.94 | Disclosed steel |

TABLE 1-continued

| | | | | | | | | | | | | | | |
|---|---|---|---|---|---|---|---|---|---|---|---|---|---|---|
| D | — | — | — | — | — | — | — | — | — | — | — | — | 2.75 | Disclosed steel |
| E | — | — | — | — | — | — | — | — | — | — | — | — | 2.80 | Disclosed steel |
| F | — | — | — | — | — | — | — | — | — | — | — | — | 3.20 | Disclosed steel |
| G | — | — | — | — | — | — | — | — | — | — | — | — | 2.69 | Disclosed steel |
| H | — | — | — | — | — | — | — | — | — | — | — | — | 2.96 | Comparative steel |
| I | — | — | — | — | — | — | — | — | — | — | — | — | 3.07 | Comparative steel |
| J | — | — | — | — | — | — | — | — | — | — | — | — | <u>2.00</u> | Comparative steel |
| K | — | — | — | — | — | — | — | — | — | — | — | — | <u>2.33</u> | Comparative steel |
| L | — | — | — | — | — | — | — | — | — | — | — | — | <u>3.79</u> | Comparative steel |
| M | — | — | — | — | — | — | — | — | — | — | — | — | 2.78 | Disclosed steel |
| N | — | — | — | — | — | — | — | — | — | — | — | — | 2.82 | Disclosed steel |
| O | 0.024 | — | — | — | — | — | — | — | — | — | — | — | 2.82 | Disclosed steel |
| P | — | 0.0014 | — | — | — | — | — | — | — | — | — | — | 2.87 | Disclosed steel |
| Q | — | — | 0.11 | — | — | — | — | — | — | — | — | — | 2.79 | Disclosed steel |
| R | — | — | — | 0.04 | — | — | — | — | — | — | — | — | 2.90 | Disclosed steel |
| S | — | — | — | — | 0.011 | — | — | — | — | — | — | — | 2.86 | Disclosed steel |
| T | — | — | — | — | — | 0.013 | — | — | — | — | — | — | 3.00 | Disclosed steel |
| U | — | — | — | — | — | 0.008 | — | — | — | — | — | — | 2.96 | Disclosed steel |
| V | — | — | — | — | — | — | 0.0014 | — | — | — | — | — | 2.66 | Disclosed steel |
| W | — | — | — | — | — | — | — | 0.005 | 0.006 | 0.003 | — | — | 2.89 | Disclosed steel |
| X | — | — | — | — | — | — | — | — | — | — | 0.0028 | — | 3.19 | Disclosed steel |
| Y | — | — | — | — | — | — | — | — | — | — | — | — | 2.83 | Disclosed steel |
| Z | — | — | — | — | — | — | — | — | — | — | — | — | 2.74 | Disclosed steel |
| a | — | — | — | — | — | — | — | — | — | — | — | — | 2.86 | Comparative steel |
| b | — | — | — | — | — | — | — | — | — | — | — | — | 2.71 | Comparative steel |

Underlines indicate outside appropriate range according to present disclosure.

TABLE 2-1

| No. | Steel sample ID | Cooling temperature after hot rolling (° C.) | Retention time in temperature range of 300° C. or more after cooling (s) | Cold rolling Rolling reduction in pass immediately before final pass (%) | Rolling reduction in final pass (%) | Cumulative rolling reduction (%) | Preliminary annealing Heating temperature (° C.) | Average cooling rate from heating temperature to 500° C. (° C./s) | Elongation rate in rolling after cooling to 50° C. or less (%) | Annealing Heating temperature (° C.) | Dew point in heating temperature range (° C.) | Average cooling rate from heating temperature to 500° C. (° C./s) | Cooling stop temperature (° C.) | Reheating temperature (° C.) | Heat retention time at reheating temperature (s) | Elongation rate in rolling after cooling to 50° C. or less (%) | Type* | Remarks |
|---|---|---|---|---|---|---|---|---|---|---|---|---|---|---|---|---|---|---|
| 1 | A | 550 | 20000 | 25 | 4 | 65 | — | — | — | 800 | −10 | 25 | 190 | 400 | 100 | 0.30 | CR | Example |
| 2 | B | 490 | 10000 | 13 | 3 | 45 | — | — | — | 780 | −35 | 20 | 210 | 400 | 30 | 0.40 | GA | Example |

TABLE 2-1-continued

| No. | Steel sample ID | Cooling temperature after hot rolling (° C.) | Retention time in temperature range of 300° C. or more after cooling (s) | Cold rolling Rolling reduction in pass immediately before final pass (%) | Rolling reduction in final pass (%) | Cumulative rolling reduction (%) | Preliminary annealing Heating temperature (° C.) | Average cooling rate from heating temperature to 500° C. (° C./s) | Elongation rate in rolling after cooling to 50° C. or less (%) | Annealing Heating temperature (° C.) | Dew point in heating temperature range (° C.) | Average cooling rate from heating temperature to 500° C. (° C./s) | Cooling stop temperature (° C.) | Reheating temperature (° C.) | Heat retention time at reheating temperature (s) | Elongation rate in rolling after cooling to 50° C. or less (%) | Type* | Remarks |
|---|---|---|---|---|---|---|---|---|---|---|---|---|---|---|---|---|---|---|
| 3 | C | 450 | 20000 | 16 | 3 | 50 | 850 | 10 | 0.10 | 800 | −10 | 30 | 190 | 380 | 30 | 0.10 | GA | Example |
| 4 | D | 500 | 9000 | 21 | 3 | 55 | — | — | — | 820 | −5 | 25 | 200 | 420 | 30 | 0.50 | GA | Example |
| 5 | D | 450 | 20000 | <u>40</u> | 3 | 55 | — | — | — | 820 | −5 | 25 | 200 | 420 | 30 | 0.50 | GA | Comparative Example |
| 6 | D | 480 | 10000 | 21 | <u>0</u> | 55 | — | — | — | 820 | −5 | 25 | 200 | 420 | 30 | 0.50 | GA | Comparative Example |
| 7 | D | 450 | 30000 | 21 | 3 | 55 | — | — | — | <u>710</u> | −5 | 25 | 200 | 420 | 30 | 0.50 | GA | Comparative Example |
| 8 | D | 450 | 20000 | 21 | 3 | 55 | — | — | — | <u>900</u> | −5 | 25 | 200 | 420 | 30 | 0.50 | GA | Comparative Example |
| 9 | D | 480 | 100000 | 21 | 3 | 55 | — | — | — | 820 | <u>−45</u> | 25 | 200 | 420 | 30 | 0.50 | GA | Comparative Example |
| 10 | D | 500 | 20000 | 21 | 3 | 55 | — | — | — | 820 | −5 | <u>3</u> | 200 | 420 | 30 | 0.50 | GA | Comparative Example |
| 11 | D | 490 | 20000 | 21 | 3 | 55 | — | — | — | 820 | −5 | 25 | <u>5</u> | 420 | 30 | 0.50 | GA | Comparative Example |
| 12 | D | 450 | 8000 | 21 | 3 | 55 | — | — | — | 820 | −5 | 25 | 320 | 420 | 30 | 0.50 | GA | Example |
| 13 | D | 480 | 20000 | 21 | 3 | 55 | — | — | — | 820 | −5 | 25 | 200 | <u>230</u> | 30 | 0.50 | GA | Example |
| 14 | D | 500 | 20000 | 21 | 3 | 55 | — | — | — | 820 | −5 | 25 | 200 | <u>520</u> | 30 | 0.50 | GA | Example |
| 15 | D | 450 | 30000 | 21 | 3 | 55 | — | — | — | 820 | −5 | 25 | 200 | 420 | <u>5</u> | 0.50 | GA | Comparative Example |
| 16 | E | 500 | 20000 | 13 | 3 | 45 | 870 | 25 | 0.20 | 800 | −15 | 30 | 220 | 400 | 30 | 0.20 | GA | Comparative Example |
| 17 | F | 490 | 20000 | 13 | 3 | 45 | 840 | 30 | 0.10 | 830 | −15 | 25 | 190 | 420 | 30 | 0.20 | EG | Comparative Example |
| 18 | G | 450 | 30000 | 23 | 3 | 60 | — | — | — | 770 | −10 | 25 | 210 | 400 | 30 | 0.20 | GA | Comparative Example |
| 19 | <u>H</u> | 490 | 20000 | 16 | 3 | 50 | — | — | — | 780 | −10 | 30 | 210 | 400 | 150 | 0.50 | CR | Comparative Example |
| 20 | <u>I</u> | 450 | 20000 | 25 | 3 | 60 | — | — | — | 820 | −5 | 25 | 200 | 380 | 30 | 0.60 | GA | Comparative Example |
| 21 | <u>J</u> | 550 | 20000 | 25 | 4 | 65 | — | — | — | 830 | −5 | 25 | 190 | 400 | 200 | 0.70 | GA | Comparative Example |
| 22 | <u>K</u> | 500 | 20000 | 23 | 3 | 60 | — | — | — | 800 | −10 | 25 | 210 | 400 | 30 | 0.30 | GA | Comparative Example |

TABLE 2-1-continued

| | | | Retention time in temperature range of 300° C. or more after cooling (s) | Cold rolling | | | Preliminary annealing | | | Annealing | | | | | | | |
|---|---|---|---|---|---|---|---|---|---|---|---|---|---|---|---|---|---|
| No. | Steel sample ID | Cooling temperature after hot rolling (° C.) | | Rolling reduction in pass immediately before final pass (%) | Rolling reduction in final pass (%) | Cumulative rolling reduction (%) | Heating temperature (° C.) | Average cooling rate from heating temperature to 500° C. (° C./s) | Elongation rate in rolling after cooling to 50° C. or less (%) | Heating temperature (° C.) | Dew point in heating temperature range (° C.) | Average cooling rate from heating temperature to 500° C. (° C./s) | Cooling stop temperature (° C.) | Reheating temperature (° C.) | Heat retention time at reheating temperature (s) | Elongation rate in rolling after cooling to 50° C. or less (%) | Type* | Remarks |
| 23 | <u>L</u> | 500 | 30000 | 16 | 3 | 50 | — | — | — | 820 | −10 | 25 | 210 | 380 | 50 | 0.20 | GA | Comparative Example |
| 24 | M | 480 | 20000 | 25 | 4 | 65 | 860 | 15 | 0.10 | 760 | −25 | 30 | 180 | 450 | 20 | 0.20 | GI | Example |
| 25 | N | 450 | 9000 | 16 | 3 | 50 | 880 | 6 | 0.10 | 800 | −15 | 25 | 180 | 420 | 30 | 0.30 | GA | Example |

Underlines indicate outside appropriate range according to present disclosure.
(*)CR: cold-rolled steel sheet,
GI: hot-dip galvanized steel sheet (no alloying treatment of zinc coating),
GA: galvannealed steel sheet,
EG: electrogalvanized steel sheet

TABLE 2-2

| | | | Retention time in temperature range of 300° C. or more after cooling (s) | Cold rolling | | | Preliminary annealing | | | Annealing | | | | | | | |
|---|---|---|---|---|---|---|---|---|---|---|---|---|---|---|---|---|---|
| No. | Steel sample ID | Cooling temperature after hot rolling (° C.) | | Rolling reduction in pass immediately before final pass (%) | Rolling reduction in final pass (%) | Cumulative rolling reduction (%) | Heating temperature (° C.) | Average cooling rate from heating temperature to 500° C. (° C./s) | Elongation rate in rolling after cooling to 50° C. or less (%) | Heating temperature (° C.) | Dew point in heating temperature range (° C.) | Average cooling rate from heating temperature to 500° C. (° C./s) | Cooling stop temperature (° C.) | Reheating temperature (° C.) | Heat retention time at reheating temperature (s) | Elongation rate in rolling after cooling to 50° C. or less (%) | Type* | Remarks |
| 26 | O | 450 | 20000 | 25 | 4 | 65 | 880 | 25 | 0.05 | 820 | −10 | 25 | 210 | 380 | 30 | 0.20 | GA | Example |
| 27 | P | 500 | 20000 | 23 | 3 | 60 | 850 | 700 | 0.10 | 830 | −30 | 25 | 190 | 420 | 30 | 0.10 | GA | Example |
| 28 | Q | 450 | 20000 | 25 | 3 | 70 | — | — | — | 825 | −15 | 15 | 200 | 400 | 20 | 0.30 | GA | Example |
| 29 | R | 480 | 20000 | 16 | 3 | 50 | — | — | — | 780 | −5 | 12 | 200 | 380 | 40 | 0.50 | GA | Example |
| 30 | S | 500 | 20000 | 23 | 3 | 60 | — | — | — | 850 | −10 | 25 | 250 | 400 | 40 | 0.50 | GA | Example |
| 31 | T | 450 | 20000 | 16 | 3 | 50 | — | — | — | 780 | 5 | 25 | 160 | 420 | 30 | 0.20 | GA | Example |
| 32 | U | 500 | 8000 | 13 | 3 | 45 | 920 | 35 | 0.50 | 780 | −20 | 20 | 200 | 420 | 40 | 0.05 | GA | Example |
| 33 | V | 450 | 20000 | 7 | 3 | 30 | — | — | — | 840 | −10 | 25 | 230 | 400 | 30 | 0.80 | GA | Example |
| 34 | W | 450 | 10000 | 9 | 3 | 35 | — | — | — | 820 | 0 | 25 | 200 | 380 | 30 | 0.50 | GA | Example |
| 35 | X | 450 | 30000 | 13 | 3 | 45 | — | — | — | 780 | −5 | 35 | 200 | 420 | 500 | 0.10 | GI | Example |
| 36 | Y | 490 | 20000 | 16 | 3 | 50 | 870 | 15 | 0.10 | 790 | −10 | 25 | 190 | 380 | 12 | 0.20 | GA | Example |
| 37 | Z | 550 | 20000 | 16 | 3 | 50 | 870 | 20 | 0.10 | 790 | −5 | 30 | 210 | 300 | 30 | 0.20 | GA | Example |
| 38 | D | 450 | 20000 | 21 | 3 | 55 | — | — | — | 820 | −5 | 25 | 300 | 480 | 30 | 0.50 | GA | Example |
| 39 | <u>a</u> | 500 | 10000 | 16 | 3 | 50 | — | — | — | 800 | −10 | 30 | 200 | 400 | 30 | 0.50 | GA | Comparative Example |
| 40 | <u>b</u> | 480 | 20000 | 16 | 3 | 50 | — | — | — | 800 | −10 | 30 | 200 | 400 | 30 | 0.50 | GA | Comparative Example |
| 41 | D | 450 | 30000 | 21 | <u>0.4</u> | 55 | — | — | — | 820 | −5 | 25 | 250 | 420 | 30 | 0.50 | GA | Comparative Example |

TABLE 2-2-continued

| No. | Steel sample ID | Cooling temperature after hot rolling (° C.) | Retention time in temperature range of 300° C. or more after cooling (s) | Rolling reduction in pass immediately before final pass (%) | Rolling reduction in final pass (%) | Cumulative rolling reduction (%) | Heating temperature (° C.) | Average cooling rate from heating temperature to 500° C. (° C./s) | Elongation rate in rolling after cooling to 50° C. or less (%) | Heating temperature (° C.) | Dew point in heating temperature range (° C.) | Average cooling rate from heating temperature to 500° C. (° C./s) | Cooling stop temperature (° C.) | Reheating temperature (° C.) | Heat retention time at reheating temperature (s) | Elongation rate in rolling after cooling to 50° C. or less (%) | Type* | Remarks |
|---|---|---|---|---|---|---|---|---|---|---|---|---|---|---|---|---|---|---|
| 42 | D | 550 | 20000 | 21 | <u>7</u> | 55 | — | — | — | 820 | −5 | 25 | 250 | 420 | 30 | 0.50 | GA | Comparative Example |
| 43 | D | 490 | 20000 | <u>4</u> | 3 | 55 | — | — | — | 820 | −5 | 25 | 250 | 420 | 30 | 0.50 | GA | Comparative Example |
| 44 | D | 550 | 100000 | 21 | 3 | 25 | — | — | — | 820 | −5 | 25 | 250 | 420 | 30 | 0.50 | GA | Example |
| 45 | E | 480 | 20000 | 13 | 3 | 45 | 800 | 25 | 0.20 | 800 | −15 | 30 | 220 | 400 | 30 | 0.20 | GA | Example |
| 46 | E | 450 | 20000 | 13 | 3 | 45 | 870 | 2 | 0.20 | 800 | −15 | 30 | 220 | 400 | 30 | 0.20 | GA | Example |
| 47 | E | 500 | 20000 | 13 | 3 | 45 | 870 | 25 | — | 800 | −15 | 30 | 220 | 400 | 30 | 0.20 | GA | Example |
| 48 | D | 480 | 20000 | 21 | 3 | 55 | — | — | — | 820 | −5 | 25 | <u>100</u> | 420 | 30 | 0.50 | GA | Comparative Example |
| 49 | D | 500 | 20000 | 21 | 3 | 55 | — | — | — | 820 | −5 | 25 | 200 | 420 | 30 | 0.00 | GA | Example |
| 50 | D | 500 | 30000 | 4 | 0.5 | 30 | — | — | — | 820 | −20 | 25 | 200 | 420 | 30 | 0.30 | GA | Example |

Underlines indicate outside appropriate range according to present disclosure.
(*)CR: cold-rolled steel sheet,
GI: hot-dip galvanized steel sheet (no alloying treatment of zinc coating),
GA: galvannealed steel sheet,
EG: electrogalvanized steel sheet Using each of the cold-rolled steel sheets and the coated or plated steel sheets obtained in the above-described manner as a sample steel, the tensile property, the stretch flangeability, the bendability, and the LME resistance were evaluated according to the following test methods.

A tensile test was conducted in accordance with JIS Z 2241. A JIS No. 5 test piece was collected from the obtained steel sheet so that its longitudinal direction would be perpendicular to the rolling direction of the steel sheet. Using the test piece, the tensile test was conducted with a crosshead displacement rate Vc of $1.67 \times 10^{-1}$ mm/s, to measure the YS, the TS, and the El. In the present disclosure, a TS of 980 MPa or more was determined as pass. In the case where the YR as an index of the dimensional accuracy in forming was 50% or more and 80% or less, the dimensional accuracy in forming was determined as good. The YR was calculated according to the foregoing formula (1). In the case where the El was 20% or more, the ductility was determined as good.

The stretch flangeability was evaluated by a hole expansion test. The hole expansion test was conducted in accordance with JIS Z 2256. A sample of 100 mm×100 mm was collected from the obtained steel sheet by shearing, and a hole with a diameter of 10 mm was drilled through the sample with clearance of 12.5%. Subsequently, the sample was clamped into a die having an inner diameter of 75 mm with a blank holding force of 9 tons (88.26 kN) pressing around the hole. In this state, a conical punch with a vertex angle of 60° was pushed into the hole, and the hole diameter at crack initiation limit was measured. The maximum hole expansion ratio λ (%) was calculated according to the following formula to evaluate the hole expansion formability:

maximum hole expansion ratio: $\lambda(\%) = \{(D_f - D_0)/D_0\} \times 100$ where $D_0$ is a hole diameter at the time of occurrence of cracking (mm) and Do is an initial hole diameter (mm). The stretch flangeability was determined as good in the case where the value of λ was 20% or more regardless of the strength of the steel sheet.

A bend test was conducted in accordance with JIS Z 2248. A strip-shaped test piece with a width of 30 mm and a length of 100 mm was collected from the obtained steel sheet so that a direction parallel to the rolling direction of the steel sheet would be the axial direction in the bend test. The bend test was then conducted by a V-block bend test with a bending angle of 90°, under the conditions of indentation load: 100 kN and press holding time: 5 s. In the present disclosure, a 90° V bend test was conducted, and the ridgeline part of the tip of the bending test specimen was observed using a microscope (RH-2000 produced by HIROX Co., Ltd.) with 40 magnification. The bending radius at which cracks of 200 μm or more in crack length were no longer recognized was taken to be the minimum bending radius (R). In the case where the value (R/t) obtained by dividing R by the thickness (t) was 2.0 or less, the result of the bend test was determined as good.

The LME resistance was evaluated by a high-temperature tensile test. As described below, in the case where the sample steel was a coated or plated steel sheet, a tensile test piece containing a coating or plating layer was cut from the steel sheet, and subjected to the high-temperature tensile test. In the case where the sample steel was a cold-rolled steel sheet without a coating or plating layer, to determine the LME resistance in the case of welding the steel sheet to a coated or plated steel sheet, the cold-rolled steel sheet and the coated or plated steel sheet were overlapped with each other and spot welded to produce a tensile test piece, which was then subjected to the high-temperature tensile test. Subsequently, in the test piece after tensile fracture, the corresponding grain boundary frequency was measured for the surface layer of the steel sheet on the side joined to the coated or plated steel sheet.

First, a strip-shaped sample with a width of 105 mm and a length of 25 mm was collected from the sample steel so that a direction perpendicular to the rolling direction of the steel sheet would be the tensile direction in the high-temperature tensile test. In the case where the sample steel was a cold-rolled steel sheet, the obtained strip-shaped sample was overlapped with a 270 MPa-grade GA steel sheet with a thickness of 0.6 mm sheared to the same size, and spot welding was performed at both ends of the sample to join the cold-rolled steel sheet and the 270 MPa-grade GA steel sheet. The end surfaces of each of the cold-rolled steel sheet joined to the 270 MPa-grade GA steel sheet and the coated or plated steel sheets (GI, GA, and EG) were ground to a width of 99 mm and a length of 20 mm. The sample was then worked so that the radius of the shoulder portion would be 20 mm, the width of the parallel portion would be 5 mm, and the length of the parallel portion would be 20 mm. Further, notches with a radius of 2 mm were formed at the center of the parallel portion on the coating or plating layer side at notch intervals of 3 mm, to produce a notched tensile test piece. Here, the thickness of the notched tensile test piece was adjusted to 1.0 mm, from the viewpoint of ensuring the contact with electrodes. In the case where the sample steel was a cold-rolled steel sheet, the 270 MPa-grade GA steel sheet was ground by 0.55 mm and the cold-rolled steel sheet was ground by 0.25 mm while keeping the surface joined to the 270 MPa-grade GA steel sheet, to adjust the thickness of the tensile test piece to 1.0 mm. In the case where the sample steel was a coated or plated steel sheet, the thickness was adjusted to 1.0 mm by single-side grinding, to produce a notched tensile test piece having a coating or plating layer on one side. The high-temperature tensile test was conducted on each obtained notched tensile test piece using a hot working reproduction device (Thermec Master-Z). After heating the test piece to 900° C. at 100° C./s, the test piece was immediately gas-cooled at 40° C./s. After reaching 700° C., the tensile test was immediately conducted at a crosshead rate of 50 mm/s until the test piece fractured, thus causing LME cracking. After the test piece fractured, the test piece was gas-cooled to 200° C. or less at 100° C./s.

For the fracture portion of the test piece subjected to the high-temperature tensile test in the above-described manner, a sample for thickness reduction measurement was collected by cutting so that a thickness section (L section) parallel to the tensile direction of the test piece would be an observation surface, and the thickness reduction defined by the foregoing formula (2) was calculated. In the present disclosure, in the case where the thickness reduction was 0.20 or more, the LME resistance was determined as good.

Moreover, the area ratio of ferrite and the area ratio of hard phase, the volume fraction of retained austenite, the carbon concentration in retained austenite, the corresponding grain boundary frequency in the surface layer of the steel sheet, the amount of diffusible hydrogen in the steel sheet, the surface layer softening thickness, and the minor axis length of retained austenite were measured by the foregoing methods. The residual microstructure was also determined through microstructure observation. Furthermore, whether the coating or plating layer had cracks was examined.

The results are shown in Tables 3-1 and 3-2.

TABLE 3-1

| No. | Steel sample ID | Area ratio of F (%) | Area ratio of hard phase (%) | Volume fraction of RA (%) | Carbon concentration in RA (%) | Minor axis length of RA (μm) | Corresponding grain boundary frequency in surface layer of steel sheet (—) | Amount of diffusible hydrogen in steel sheet (mass ppm) | Surface layer softening thickness (μm) | Cracks of coating or plating layer (—) | Residual microstructure | YS (MPa) | TS (MPa) | YR (%) | El (%) | λ (%) | R/t (—) | Thickness reduction (—) | Remarks |
|---|---|---|---|---|---|---|---|---|---|---|---|---|---|---|---|---|---|---|---|
| 1 | A | 46.7 | 45.9 | 6.9 | 0.89 | 1.84 | 0.34 | 0.24 | 18 | Not cracked | θ | 672 | 988 | 68 | 24.6 | 28 | 1.8 | 0.49 | Example |
| 2 | B | 30.9 | 57.3 | 11.3 | 0.70 | 1.81 | 0.15 | 0.31 | 7 | Cracked | θ | 628 | 1013 | 62 | 24.2 | 32 | 1.1 | 0.29 | Example |
| 3 | C | 31.8 | 52.5 | 15.1 | 0.76 | 0.69 | 0.33 | 0.34 | 5 | Cracked | θ | 746 | 1066 | 70 | 24.4 | 33 | 1.8 | 0.27 | Example |
| 4 | D | 43.2 | 45.6 | 11.0 | 0.81 | 1.11 | 0.31 | 0.24 | 64 | Cracked | θ | 608 | 996 | 61 | 23.6 | 26 | 1.2 | 0.33 | Example |
| 5 | D | <u>11.5</u> | 77.0 | 11.0 | 0.83 | 1.70 | 0.18 | <u>0.81</u> | 64 | Cracked | θ | 885 | 1083 | <u>82</u> | <u>16.8</u> | <u>13</u> | <u>4.6</u> | 0.34 | Comparative Example |

TABLE 3-1-continued

| No. | Steel sample ID | Area ratio of F (%) | Area ratio of hard phase (%) | Volume fraction of RA (%) | Carbon concentration in RA (%) | Minor axis length of RA (μm) | Corresponding grain boundary frequency in surface layer of steel sheet (—) | Amount of diffusible hydrogen in steel sheet (mass ppm) | Surface layer softening thickness (μm) | Cracks of coating or plating layer (—) | Residual microstructure | YS (MPa) | TS (MPa) | YR (%) | El (%) | λ (%) | R/t (—) | Thickness reduction (—) | Remarks |
|---|---|---|---|---|---|---|---|---|---|---|---|---|---|---|---|---|---|---|---|
| 6 | D | 40.9 | 45.0 | 9.2 | 0.85 | 1.27 | <u>0.53</u> | 0.35 | 76 | Cracked | θ | 617 | 1061 | 58 | 24.7 | 26 | 1.4 | <u>0.10</u> | Comparative Example |
| 7 | D | <u>84.8</u> | <u>4.1</u> | <u>2.0</u> | 0.69 | 1.39 | 0.22 | 0.31 | 32 | Cracked | θ | 653 | <u>960</u> | 68 | <u>18.7</u> | 34 | 1.3 | 0.33 | Comparative Example |
| 8 | D | <u>0.0</u> | <u>89.9</u> | 9.8 | 0.74 | 1.83 | 0.30 | <u>0.84</u> | 40 | Cracked | θ | 503 | 1117 | <u>45</u> | <u>10.4</u> | <u>15</u> | 4.2 | 0.35 | Comparative Example |
| 9 | D | 40.0 | 49.2 | 10.4 | 0.74 | 1.36 | 0.21 | 0.11 | <u>0</u> | Not cracked | θ | 648 | 1028 | 63 | 23.3 | 32 | 4.2 | <u>0.10</u> | Comparative Example |
| 10 | D | <u>64.7</u> | <u>27.4</u> | 7.1 | 0.72 | 1.27 | 0.21 | 0.06 | 77 | Cracked | θ | 405 | <u>942</u> | <u>43</u> | 23.2 | 34 | 1.6 | 0.31 | Comparative Example |
| 11 | D | 45.1 | 52.8 | <u>1.4</u> | <u>0.43</u> | 1.81 | 0.26 | 0.01 | 60 | Cracked | θ | 913 | 1037 | <u>88</u> | <u>17.8</u> | 34 | 1.6 | 0.34 | Comparative Example |
| 12 | D | 33.7 | 60.0 | <u>2.2</u> | <u>0.36</u> | 2.45 | 0.32 | <u>0.84</u> | 59 | Cracked | θ | 435 | 1012 | <u>43</u> | <u>15.5</u> | <u>15</u> | 3.9 | 0.34 | Comparative Example |
| 13 | D | 44.9 | 49.4 | <u>1.9</u> | <u>0.44</u> | 2.29 | 0.26 | <u>0.84</u> | 17 | Cracked | θ | 453 | <u>984</u> | <u>46</u> | <u>18.6</u> | <u>13</u> | 4.8 | 0.30 | Comparative Example |
| 14 | D | 47.4 | 48.1 | <u>2.3</u> | <u>0.50</u> | 2.08 | 0.31 | 0.20 | 40 | Cracked | θ | 404 | <u>985</u> | <u>41</u> | <u>16.0</u> | <u>13</u> | 4.0 | 0.37 | Comparative Example |
| 15 | D | 39.1 | 53.7 | <u>2.6</u> | <u>0.42</u> | 1.05 | 0.23 | <u>0.84</u> | 26 | Cracked | θ | 467 | <u>993</u> | <u>47</u> | <u>16.2</u> | <u>9</u> | 4.5 | 0.36 | Comparative Example |
| 16 | E | 41.1 | 45.3 | 12.7 | 0.76 | 0.47 | 0.16 | 0.31 | 11 | Cracked | θ | 605 | 991 | 61 | 23.2 | 28 | 1.3 | 0.33 | Example |
| 17 | F | 45.3 | 45.5 | 8.0 | 0.89 | 0.29 | 0.16 | 0.55 | 14 | Not cracked | θ | 549 | 998 | 55 | 21.7 | 22 | 2.0 | 0.23 | Example |
| 18 | G | 46.7 | 47.6 | 5.3 | 0.85 | 1.30 | 0.18 | 0.57 | 21 | Cracked | θ | 743 | 1092 | 68 | 24.1 | 26 | 1.4 | 0.36 | Example |
| 19 | <u>H</u> | <u>67.1</u> | <u>30.7</u> | 1.7 | 0.65 | 1.96 | 0.23 | 0.34 | 31 | Not cracked | θ | 599 | <u>951</u> | 63 | <u>17.8</u> | 31 | 1.2 | 0.34 | Comparative Example |

TABLE 3-1-continued

| No. | Steel sample ID | Area ratio of F (%) | Area ratio of hard phase (%) | Volume fraction of RA (%) | Carbon concentration in RA (%) | Minor axis length of RA (μm) | Corresponding grain boundary frequency in surface layer of steel sheet (—) | Amount of diffusible hydrogen in steel sheet (mass ppm) | Surface layer softening thickness (μm) | Cracks of coating or plating layer (—) | Residual microstructure | YS (MPa) | TS (MPa) | YR (%) | El (%) | λ (%) | R/t (—) | Thickness reduction (—) | Remarks |
|---|---|---|---|---|---|---|---|---|---|---|---|---|---|---|---|---|---|---|---|
| 20 | <u>I</u> | 34.6 | 52.2 | 10.6 | <u>1.21</u> | 1.88 | <u>0.59</u> | 0.45 | 26 | Cracked | θ | 639 | 1047 | 61 | 24.1 | <u>13</u> | <u>3.1</u> | <u>0.14</u> | Comparative Example |
| 21 | <u>J</u> | <u>64.9</u> | <u>23.3</u> | 10.4 | 0.70 | 1.65 | 0.18 | 0.06 | 70 | Cracked | θ | 528 | <u>943</u> | 56 | 23.2 | 26 | 1.2 | 0.35 | Comparative Example |
| 22 | <u>K</u> | <u>61.7</u> | <u>27.1</u> | 9.6 | 0.75 | 1.89 | 0.25 | 0.10 | 16 | Cracked | θ | 672 | <u>946</u> | 71 | 23.5 | 28 | 1.7 | 0.38 | Comparative Example |
| 23 | <u>L</u> | <u>5.4</u> | <u>90.3</u> | 2.6 | 0.84 | 1.81 | 0.19 | <u>0.85</u> | 34 | Cracked | θ | 1016 | 1142 | <u>89</u> | <u>10.4</u> | <u>10</u> | <u>4.5</u> | 0.30 | Comparative Example |
| 24 | M | 49.5 | 45.9 | 4.4 | 0.76 | 0.89 | 0.40 | 0.25 | 11 | Not Cracked | θ | 701 | 1131 | 62 | 21.5 | 33 | 1.3 | 0.21 | Example |
| 25 | N | 45.9 | 46.1 | 6.9 | 0.97 | 0.46 | 0.39 | 0.40 | 12 | Cracked | θ | 547 | 995 | 55 | 21.5 | 22 | 1.9 | 0.29 | Example |

Underlines indicate outside appropriate range according to present disclosure.
F: ferrite, hard phase: bainitic ferrite, bainite, tempered martensite, quenched martensite, RA: retained austenite, θ: cementite

TABLE 3-2

| No. | Steel sample ID | Area ratio of F (%) | Area ratio of hard phase (%) | Volume fraction of RA (%) | Carbon concentration in RA (%) | Minor axis length of RA (μm) | Corresponding grain boundary frequency in surface layer of steel sheet (—) | Amount of diffusible hydrogen in steel sheet (mass ppm) | Surface layer softening thickness (μm) | Cracks of coating or plating layer (—) | Residual microstructure | YS (MPa) | TS (MPa) | YR (%) | El (%) | λ (%) | R/t (—) | Thickness reduction (—) | Remarks |
|---|---|---|---|---|---|---|---|---|---|---|---|---|---|---|---|---|---|---|---|
| 26 | O | 35.8 | 45.2 | 14.5 | 0.75 | 0.39 | 0.43 | 0.06 | 14 | Cracked | θ | 772 | 1068 | 68 | 24.3 | 34 | 1.5 | 0.29 | Example |
| 27 | P | 37.4 | 45.6 | 15.9 | 0.76 | 0.67 | 0.40 | 0.32 | 9 | Cracked | θ | 632 | 1020 | 62 | 24.4 | 32 | 2.0 | 0.26 | Example |
| 28 | Q | 45.7 | 47.7 | 5.7 | 0.81 | 1.35 | 0.24 | 0.08 | 29 | Cracked | θ | 535 | 991 | 54 | 23.8 | 32 | 1.5 | 0.35 | Example |
| 29 | R | 49.5 | 45.4 | 4.6 | 0.72 | 1.25 | 0.22 | 0.20 | 55 | Cracked | θ | 530 | 981 | 54 | 24.6 | 32 | 1.7 | 0.36 | Example |
| 30 | S | 42.8 | 47.5 | 5.1 | 0.86 | 1.92 | 0.23 | 0.37 | 46 | Cracked | θ | 542 | 1022 | 53 | 21.5 | 21 | 1.9 | 0.30 | Example |
| 31 | T | 40.5 | 54.3 | 4.7 | 0.70 | 1.59 | 0.26 | 0.05 | 59 | Cracked | θ | 693 | 1066 | 65 | 22.0 | 25 | 12 | 0.40 | Example |
| 32 | U | 33.1 | 52.7 | 13.3 | 0.83 | 0.78 | 0.36 | 0.54 | 15 | Cracked | θ | 715 | 1052 | 68 | 23.3 | 30 | 1.9 | 0.28 | Example |
| 33 | V | 44.2 | 45.6 | 9.2 | 0.74 | 1.57 | 0.23 | 0.25 | 62 | Cracked | θ | 505 | 990 | 51 | 24.2 | 28 | 1.6 | 0.39 | Example |
| 34 | W | 42.9 | 45.4 | 10.6 | 0.81 | 1.02 | 0.34 | 0.24 | 25 | Cracked | θ | 510 | 981 | 52 | 23.2 | 28 | 1.1 | 0.37 | Example |

TABLE 3-2-continued

| No. | Steel sample ID | Area ratio of F (%) | Area ratio of hard phase (%) | Volume fraction of RA (%) | Carbon concentration in RA (%) | Minor axis length of RA (μm) | Corresponding grain boundary frequency in surface layer of steel sheet (—) | Amount of diffusible hydrogen in steel sheet (mass ppm) | Surface layer softening thickness (μm) | Cracks of coating or plating layer | Residual microstructure | YS (MPa) | TS (MPa) | YR (%) | El (%) | λ (%) | R/t (—) | Thickness reduction (—) | Remarks |
|---|---|---|---|---|---|---|---|---|---|---|---|---|---|---|---|---|---|---|---|
| 35 | X | 38.5 | 46.4 | 14.7 | 0.98 | 0.17 | 0.24 | 0.14 | 47 | Not cracked | θ | 732 | 989 | 74 | 27.3 | 41 | 0.9 | 0.22 | Example |
| 36 | Y | 34.7 | 48.3 | 13.5 | 0.61 | 0.95 | 0.29 | 0.17 | 13 | Cracked | θ | 617 | 1045 | 59 | 21.7 | 24 | 1.8 | 0.41 | Example |
| 37 | Z | 28.8 | 59.0 | 10.5 | 0.62 | 0.63 | 0.21 | 0.59 | 14 | Cracked | θ | 608 | 1048 | 58 | 21.2 | 22 | 1.8 | 0.44 | Example |
| 38 | D | 46.7 | 45.4 | 7.0 | 0.84 | 2.09 | 0.26 | 0.10 | 17 | Cracked | θ | 709 | 985 | 72 | 21.6 | 20 | 2.0 | 0.37 | Example |
| 39 | a | 45.2 | 45.0 | 8.2 | 0.68 | 1.25 | 0.22 | 0.35 | <u>0</u> | Cracked | θ | 730 | 1014 | 72 | 23.2 | 25 | <u>3.9</u> | <u>10.0</u> | Comparative Example |
| 40 | b | 38.9 | 45.8 | 14.3 | 0.81 | 1.84 | 0.21 | 0.29 | 45 | Cracked | θ | 650 | 1048 | 62 | 23.7 | 29 | <u>4.2</u> | 0.36 | Comparative Example |
| 41 | D | 43.0 | 45.8 | 10.8 | 0.80 | 1.81 | <u>0.56</u> | 0.13 | 17 | Cracked | θ | 687 | 995 | 69 | 24.9 | 28 | 1.3 | <u>0.11</u> | Comparative Example |
| 42 | D | 42.9 | 46.8 | 10.1 | 0.73 | 1.87 | <u>0.48</u> | 0.34 | 36 | Cracked | θ | 659 | 998 | 66 | 23.6 | 34 | 1.3 | <u>0.12</u> | Comparative Example |
| 43 | D | <u>63.3</u> | <u>26.4</u> | 9.4 | 0.87 | 1.88 | 0.32 | 0.33 | 15 | Cracked | θ | 600 | <u>968</u> | 62 | 24.2 | 34 | 1.8 | 0.38 | Comparative Example |
| 44 | D | 46.2 | 42.4 | 10.5 | 0.78 | 1.89 | 0.25 | 0.27 | 44 | Cracked | θ | 559 | 981 | 57 | 24.2 | 25 | 1.4 | 0.39 | Example |
| 45 | E | 48.6 | 47.1 | 4.2 | 0.84 | 0.90 | 0.31 | 0.37 | 12 | Cracked | θ | 533 | 987 | 54 | 23.4 | 26 | 1.3 | 0.32 | Example |
| 46 | E | 49.1 | 45.3 | 4.1 | 0.89 | 0.71 | 0.20 | 0.39 | 11 | Cracked | θ | 538 | 996 | 54 | 24.0 | 34 | 1.6 | 0.32 | Example |
| 47 | E | 42.2 | 45.9 | 11.0 | 0.85 | 0.42 | 0.40 | 0.24 | 14 | Cracked | θ | 657 | 995 | 66 | 24.0 | 32 | 13 | 0.25 | Example |
| 48 | D | 45.2 | 50.3 | <u>3.3</u> | <u>0.48</u> | 1.60 | 0.18 | 0.02 | 40 | Cracked | θ | 862 | 1039 | <u>83</u> | <u>18.9</u> | 44 | 0.7 | 0.31 | Comparative Example |
| 49 | D | 41.1 | 46.7 | 11.9 | 0.78 | 1.34 | 0.33 | 0.38 | 34 | Cracked | θ | 729 | 985 | 74 | 24.3 | 23 | 1.8 | 0.35 | Example |
| 50 | D | 43.7 | 48.6 | 10.6 | 0.80 | 1.42 | 0.34 | 0.35 | 16 | Cracked | θ | 694 | 991 | 70 | 23.7 | 24 | 1.9 | 0.29 | Example |

Underlines indicate outside appropriate range according to present disclosure.
F: ferrite, hard phase: bainitic ferrite, bainite, tempered martensite, quenched martensite, RA: retained austenite, θ: cementite As shown in Tables 3-1 and 3-2, in Examples, the TS was 980 MPa or more, and the dimensional accuracy in forming, the ductility, the stretch flangeability, the bendability, and the LME resistance were good. In Comparative Examples, one or more of the tensile strength (TS), the dimensional accuracy in forming (YR), the ductility (El), the stretch flangeability (λ), the bendability (R/t), and the LME resistance (thickness reduction) were poor.

INDUSTRIAL APPLICABILITY

The high-strength steel sheet according to the present disclosure can be used, for example, in structural members such as automotive parts, to improve fuel efficiency by weight reduction of vehicle bodies.

The invention claimed is:

1. A high-strength steel sheet comprising:
a chemical composition containing, in mass %,
C: 0.120% or more and 0.250% or less,
Si: 0.80% or more and 2.00% or less,
Mn: 1.50% or more and 2.45% or less,
P: 0.001% or more and 0.100% or less,
S: 0.0200% or less,
Al: 0.010% or more and 1.000% or less,
N: 0.0100% or less,
Mo: 0.500% or less,
Cr: 0.300% or less,
Ca: 0.0200% or less, and
Sb: 0.200% or less,
with a balance being Fe and inevitable impurities, wherein $Mn_{eq}$ calculated according to the following formula (1) is 2.40% or more and 3.40% or less, $$Mn_{eq}=0.26\times[\% \text{ Si}]+[\% \text{ Mn}]+3.5\times[\% \text{ P}]+2.68\times[\% \text{ Mo}]+1.29\times[\% \text{ Cr}] \quad (1)$$

where [% Si], [% Mn], [% P], [% Mo], and [% Cr] denotes content in mass % of Si, Mn, P, Mo, and Cr in steel, respectively, and is 0 in the case where each of Si, Mn, P, Mo, and Cr is not contained;
a steel microstructure in which an area ratio of ferrite is 15% or more and 55% or less, an area ratio of hard phase which is any of bainitic ferrite, bainite, tempered martensite, and quenched martensite is 40% or more and 85% or less, a volume fraction of retained austenite is 4% or more and 20% or less, a carbon concentration in the retained austenite is 0.55% or more and 1.10% or less, an amount of diffusible hydrogen in the steel sheet is 0.80 mass ppm or less, a surface layer softening thickness is 5 μm or more and 150 μm or less, and a corresponding grain boundary frequency in a surface layer of the steel sheet after a high-temperature tensile test is 0.45 or less, where the high-temperature tensile test is performed such that after heating a test piece to 900° C. at 100° C./s, the test piece immediately gas-cooled at 40° C./s and after reaching 700° C., a tensile test immediately conducted at a crosshead rate of 50 mm/s until the test piece fractured; and
a tensile strength of 980 MPa or more.

2. The high-strength steel sheet according to claim 1, wherein an average minor axis length of the retained austenite is 2.0 μm or less.

3. The high-strength steel sheet according to claim 1, wherein the chemical composition further contains, in mass %, at least one selected from the group consisting of
Ti: 0.001% or more and 0.100% or less,
Nb: 0.001% or more and 0.100% or less,
V: 0.001% or more and 0.100% or less,
B: 0.0001% or more and 0.0100% or less,
Cu: 0.01% or more and 1.00% or less,
Ni: 0.01% or more and 0.50% or less,
Sn: 0.001% or more and 0.200% or less,
Ta: 0.001% or more and 0.100% or less,
Mg: 0.0001% or more and 0.0200% or less,
Zn: 0.001% or more and 0.020% or less,
Co: 0.001% or more and 0.020% or less,
Zr: 0.001% or more and 0.020% or less, and
REM: 0.0001% or more and 0.0200% or less.

4. The high-strength steel sheet according to claim 1, comprising
a coating or plating layer at a surface thereof.

5. The high-strength steel sheet according to claim 2, wherein the chemical composition further contains, in mass %, at least one selected from the group consisting of
Ti: 0.001% or more and 0.100% or less,
Nb: 0.001% or more and 0.100% or less,
V: 0.001% or more and 0.100% or less,
B: 0.0001% or more and 0.0100% or less,
Cu: 0.01% or more and 1.00% or less,
Ni: 0.01% or more and 0.50% or less,
Sn: 0.001% or more and 0.200% or less,
Ta: 0.001% or more and 0.100% or less,
Mg: 0.0001% or more and 0.0200% or less,
Zn: 0.001% or more and 0.020% or less,
Co: 0.001% or more and 0.020% or less,
Zr: 0.001% or more and 0.020% or less, and
REM: 0.0001% or more and 0.0200% or less.

6. The high-strength steel sheet according to claim 2, comprising
a coating or plating layer at a surface thereof.

7. The high-strength steel sheet according to claim 3, comprising
a coating or plating layer at a surface thereof.

8. The high-strength steel sheet according to claim 5, comprising
a coating or plating layer at a surface thereof.

9. A method for producing the high-strength steel sheet of claim 1, the method comprising:
subjecting a steel slab having the chemical composition according to claim 1 to hot rolling, to obtain a hot-rolled sheet;
thereafter subjecting the hot-rolled sheet to pickling;
thereafter subjecting the hot-rolled sheet to cold rolling under a condition that a rolling reduction in a final pass in the cold rolling is 1% or more and 5% or less and a rolling reduction in a pass immediately before the final pass is 5% or more and 30% or less, to obtain a cold-rolled sheet;
thereafter subjecting the cold-rolled sheet to annealing that involves heating to a heating temperature of 740° C. or more and 880° C. or less in an atmosphere with a dew point of −35° C. or more and thereafter cooling to a cooling stop temperature of 150° C. or more and 300° C. or less under a condition that an average cooling rate from the heating temperature to 500° C. is 10° C./s or more; and
thereafter reheating the cold-rolled sheet to a reheating temperature that is not less than a sum of the cooling stop temperature and 50° C. and is not more than 500° C., and holding the cold-rolled sheet at the reheating temperature for 10 s or more.

10. A method for producing the high-strength steel sheet of claim 3, the method comprising:

subjecting a steel slab having the chemical composition according to claim 3 to hot rolling, to obtain a hot-rolled sheet;

thereafter subjecting the hot-rolled sheet to pickling;

thereafter subjecting the hot-rolled sheet to cold rolling under a condition that a rolling reduction in a final pass in the cold rolling is 1% or more and 5% or less and a rolling reduction in a pass immediately before the final pass is 5% or more and 30% or less, to obtain a cold-rolled sheet;

thereafter subjecting the cold-rolled sheet to annealing that involves heating to a heating temperature of 740° C. or more and 880° C. or less in an atmosphere with a dew point of −35° C. or more and thereafter cooling to a cooling stop temperature of 150° C. or more and 300° C. or less under a condition that an average cooling rate from the heating temperature to 500° C. is 10° C./s or more; and thereafter reheating the cold-rolled sheet to a reheating temperature that is not less than a sum of the cooling stop temperature and 50° C. and is not more than 500° C., and holding the cold-rolled sheet at the reheating temperature for 10 s or more.

11. A method for producing high-strength steel sheet of claim 5, the method comprising:

subjecting a steel slab having the chemical composition according to claim 8 to hot rolling, to obtain a hot-rolled sheet;

thereafter subjecting the hot-rolled sheet to pickling;

thereafter subjecting the hot-rolled sheet to cold rolling under a condition that a rolling reduction in a final pass in the cold rolling is 1% or more and 5% or less and a rolling reduction in a pass immediately before the final pass is 5% or more and 30% or less, to obtain a cold-rolled sheet;

thereafter subjecting the cold-rolled sheet to annealing that involves heating to a heating temperature of 740° C. or more and 880° C. or less in an atmosphere with a dew point of −35° C. or more and thereafter cooling to a cooling stop temperature of 150° C. or more and 300° C. or less under a condition that an average cooling rate from the heating temperature to 500° C. is 10° C./s or more; and thereafter reheating the cold-rolled sheet to a reheating temperature that is not less than a sum of the cooling stop temperature and 50° C. and is not more than 500° C., and holding the cold-rolled sheet at the reheating temperature for 10 s or more.

12. The method for producing a high-strength steel sheet according to claim 9, comprising subjecting the cold-rolled sheet to preliminary annealing that involves heating to a heating temperature of 830° C. or more and cooling under a condition that an average cooling rate from the heating temperature to 500° C. is 5° C./s or more, after the cold rolling and before the annealing.

13. The method for producing a high-strength steel sheet according to claim 10, comprising subjecting the cold-rolled sheet to preliminary annealing that involves heating to a heating temperature of 830° C. or more and cooling under a condition that an average cooling rate from the heating temperature to 500° C. is 5° C./s or more, after the cold rolling and before the annealing.

14. The method for producing a high-strength steel sheet according to claim 11, comprising subjecting the cold-rolled sheet to preliminary annealing that involves heating to a heating temperature of 830° C. or more and cooling under a condition that an average cooling rate from the heating temperature to 500° C. is 5° C./s or more, after the cold rolling and before the annealing.

15. The method for producing a high-strength steel sheet according to claim 12, comprising cooling the cold-rolled sheet to 50° C. or less and rolling the cold-rolled sheet at an elongation rate of 0.05% or more and 1.00% or less, after the preliminary annealing and before the annealing.

16. The method for producing a high-strength steel sheet according to claim 13, comprising cooling the cold-rolled sheet to 50° C. or less and rolling the cold-rolled sheet at an elongation rate of 0.05% or more and 1.00% or less, after the preliminary annealing and before the annealing.

17. The method for producing a high-strength steel sheet according to claim 14, comprising cooling the cold-rolled sheet to 50° C. or less and rolling the cold-rolled sheet at an elongation rate of 0.05% or more and 1.00% or less, after the preliminary annealing and before the annealing.

* * * * *